US009829987B2

(12) United States Patent
Bandt-Horn

(10) Patent No.: US 9,829,987 B2
(45) Date of Patent: *Nov. 28, 2017

(54) DEVICE AND USER INTERFACE FOR VISUALIZING, NAVIGATING, AND MANIPULATING HIERARCHICALLY STRUCTURED INFORMATION ON HOST ELECTRONIC DEVICES

(71) Applicant: Benjamin D. Bandt-Horn, Ripley, MI (US)

(72) Inventor: Benjamin D. Bandt-Horn, Ripley, MI (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/680,467

(22) Filed: Apr. 7, 2015

(65) Prior Publication Data

US 2015/0205367 A1 Jul. 23, 2015

Related U.S. Application Data

(62) Division of application No. 13/674,472, filed on Nov. 12, 2012, now Pat. No. 9,007,302.

(Continued)

(51) Int. Cl.
| | |
|---|---|
| G06F 3/038 | (2013.01) |
| G06F 3/01 | (2006.01) |
| G06F 3/02 | (2006.01) |
| G06F 3/044 | (2006.01) |
| G06F 3/0485 | (2013.01) |
| G06F 3/0362 | (2013.01) |

(52) U.S. Cl.
CPC ............ *G06F 3/017* (2013.01); *G06F 3/0202* (2013.01); *G06F 3/0362* (2013.01); *G06F 3/044* (2013.01); *G06F 3/0485* (2013.01); *G06F 2203/0331* (2013.01); *G09G 2370/16* (2013.01)

(58) Field of Classification Search
CPC ...... G06F 3/017; G06F 3/0362; G06F 3/0485; G06F 3/044; G06F 3/0202; G06F 2203/0331; G09G 2370/16
See application file for complete search history.

(56) References Cited

U.S. PATENT DOCUMENTS

| | | |
|---|---|---|
| 4,550,250 A | 10/1985 | Mueller et al. |
| 4,905,001 A | 2/1990 | Penner |

(Continued)

OTHER PUBLICATIONS

"Botanical Visualization of Huge Hierarchies" by Ernst Kleinberg, Huub van de Wetering, Jarke J. van Wijk.

(Continued)

*Primary Examiner* — Adam R Giesy
(74) *Attorney, Agent, or Firm* — Gardner, Linn, Burkhart & Flory, LLP

(57) ABSTRACT

A defined class of input devices is disclosed, consisting of a graspable body in two forms. Both forms include a scroll wheel-style mechanism that functions as a button from multiple directions, both include an apparatus providing six degrees of gestural freedom in three dimensions, and both provide for the wireless transmission capacity of these inputs, user data, audio, and other communications for the purpose of carrying credentials among various host electronic devices, and for manipulating and navigating an associated user interface for hierarchy visualization of structured information to be displayed on those host devices.

12 Claims, 17 Drawing Sheets

Related U.S. Application Data

(60) Provisional application No. 61/558,572, filed on Nov. 11, 2011.

(56) References Cited

U.S. PATENT DOCUMENTS

| | | | |
|---|---|---|---|
| 4,954,817 A | 9/1990 | Levine | |
| 5,021,976 A | 6/1991 | Wexelblat et al. | |
| 5,043,920 A | 8/1991 | Malm et al. | |
| 5,073,770 A | 12/1991 | Lowbner | |
| D325,225 S | 4/1992 | Adhida | |
| 5,166,668 A | 11/1992 | Aoyagi | |
| 5,227,622 A | 7/1993 | Suzuki | |
| 5,453,759 A | 9/1995 | Seebach | |
| D364,609 S | 11/1995 | Sanchez et al. | |
| 5,481,265 A | 1/1996 | Russell | |
| 5,489,922 A | 2/1996 | Zloof | |
| 5,555,354 A | 9/1996 | Strasnick et al. | |
| 5,638,092 A | 6/1997 | Eng et al. | |
| 5,671,381 A | 9/1997 | Strasnick et al. | |
| 5,706,026 A | 1/1998 | Kent et al. | |
| 5,898,421 A | 4/1999 | Quinn | |
| 5,945,981 A | 8/1999 | Paull et al. | |
| 6,164,808 A | 12/2000 | Shibata et al. | |
| 6,297,808 B1 | 10/2001 | Yang | |
| 6,400,353 B1 | 6/2002 | Ikehara et al. | |
| 6,426,741 B1 | 7/2002 | Goldsmith et al. | |
| 6,473,713 B1 | 10/2002 | McCall et al. | |
| 6,608,616 B2 | 8/2003 | Lin | |
| 6,639,614 B1 | 10/2003 | Kosslyn et al. | |
| 6,724,365 B1 | 4/2004 | Escamilla et al. | |
| 6,753,888 B2 | 6/2004 | Kamiwada et al. | |
| 6,857,106 B1 | 2/2005 | Brouaux | |
| 6,897,854 B2 | 5/2005 | Cho et al. | |
| 7,023,425 B2 | 4/2006 | Casebolt et al. | |
| 7,061,471 B2 | 6/2006 | Bohn | |
| 7,079,110 B2 | 7/2006 | Ledbetter et al. | |
| 7,145,549 B1 | 12/2006 | Sun | |
| 7,257,255 B2 | 8/2007 | Pittel | |
| 7,283,122 B2 | 10/2007 | Bohn et al. | |
| 7,324,090 B2 | 1/2008 | Koo | |
| 7,378,605 B2 | 5/2008 | Lo | |
| 7,379,052 B1 | 5/2008 | Dellenger | |
| 7,414,611 B2 | 8/2008 | Liberty | |
| 7,443,382 B2 | 10/2008 | Koo et al. | |
| 7,489,299 B2 | 2/2009 | Liberty et al. | |
| 7,525,532 B2 | 4/2009 | Liu et al. | |
| RE40,956 E | 11/2009 | Murray, Jr. | |
| 7,626,586 B1 | 12/2009 | Perttunen | |
| 7,664,961 B2 | 2/2010 | Blattner et al. | |
| 7,668,046 B2 | 2/2010 | Banker et al. | |
| 7,760,184 B2 | 7/2010 | Pihlaja | |
| 7,774,155 B2 | 8/2010 | Sato et al. | |
| 7,791,598 B2 | 9/2010 | Bathiche | |
| 7,826,641 B2 | 11/2010 | Mandella et al. | |
| 7,864,166 B2 | 1/2011 | Lapstun et al. | |
| 7,927,216 B2 | 4/2011 | Ikeda et al. | |
| 7,961,909 B2 | 6/2011 | Mandella et al. | |
| 8,350,811 B2 | 1/2013 | Jensen | |
| 2001/0025289 A1 | 9/2001 | Jenkins et al. | |
| 2002/0148655 A1 | 10/2002 | Cho et al. | |
| 2002/0178369 A1 | 11/2002 | Black | |
| 2003/0080942 A1 | 5/2003 | Danzyger et al. | |
| 2003/0151593 A1 | 8/2003 | Hong | |
| 2004/0046732 A1 | 3/2004 | Chesters | |
| 2004/0174336 A1 | 9/2004 | Bohn | |
| 2004/0233790 A1 | 11/2004 | Narayanaswami | |
| 2005/0030288 A1 | 2/2005 | Johnson | |
| 2005/0110779 A1 | 5/2005 | Huang et al. | |
| 2005/0174324 A1 | 8/2005 | Liberty et al. | |
| 2005/0179663 A1 | 8/2005 | Ludwig | |
| 2005/0190144 A1 | 9/2005 | Kong | |
| 2005/0253806 A1 | 11/2005 | Liberty et al. | |
| 2005/0270275 A1 | 12/2005 | Jung | |
| 2006/0001657 A1 | 1/2006 | Monney et al. | |
| 2006/0022944 A1 | 2/2006 | Pai | |
| 2006/0046650 A1 | 3/2006 | Kohli et al. | |
| 2006/0055686 A1 | 3/2006 | Lee | |
| 2006/0092133 A1 | 5/2006 | Touma et al. | |
| 2006/0184902 A1 | 8/2006 | Hayes, Jr. et al. | |
| 2006/0192759 A1 | 8/2006 | Adams et al. | |
| 2006/0197754 A1* | 9/2006 | Keely | G06F 3/03545 345/179 |
| 2006/0290655 A1 | 12/2006 | Chou | |
| 2007/0139377 A1 | 6/2007 | Chiang et al. | |
| 2007/0146311 A1 | 6/2007 | Lin et al. | |
| 2007/0152970 A1 | 7/2007 | Chen et al. | |
| 2007/0159462 A1 | 7/2007 | Yen et al. | |
| 2007/0176909 A1 | 8/2007 | Pavlowski | |
| 2007/0222752 A1 | 9/2007 | Hsieh | |
| 2008/0088596 A1 | 4/2008 | Prest et al. | |
| 2008/0117169 A1 | 5/2008 | Chiang | |
| 2008/0122808 A1 | 5/2008 | Huang | |
| 2008/0278445 A1 | 11/2008 | Sweetser et al. | |
| 2009/0014524 A1 | 1/2009 | Silverbrook et al. | |
| 2009/0033640 A1 | 2/2009 | Hsu | |
| 2009/0079693 A1 | 3/2009 | Monney et al. | |
| 2009/0079739 A1 | 3/2009 | Fitzmaurice et al. | |
| 2009/0096750 A1 | 4/2009 | Lee | |
| 2009/0102817 A1 | 4/2009 | Bathiche et al. | |
| 2009/0122012 A1 | 5/2009 | Bohn | |
| 2009/0141046 A1 | 6/2009 | Rathnam et al. | |
| 2009/0153367 A1 | 6/2009 | Lee | |
| 2009/0213075 A1 | 8/2009 | Dai et al. | |
| 2009/0288035 A1 | 11/2009 | Tunning et al. | |
| 2009/0295725 A1 | 12/2009 | Chou | |
| 2009/0303180 A1 | 12/2009 | Chin et al. | |
| 2009/0303182 A1 | 12/2009 | Wu | |
| 2009/0327963 A1 | 12/2009 | Mouilleseaux et al. | |
| 2010/0085306 A1 | 4/2010 | Wu | |
| 2010/0127978 A1* | 5/2010 | Peterson | G06F 3/03545 345/158 |
| 2010/0164908 A1 | 7/2010 | Hill et al. | |
| 2011/0018799 A1 | 1/2011 | Lin | |
| 2011/0128224 A1 | 6/2011 | Ludwig | |
| 2011/0134039 A1 | 6/2011 | Ludwig | |
| 2012/0127088 A1* | 5/2012 | Pance | G06F 3/016 345/173 |
| 2012/0206330 A1* | 8/2012 | Cao | G06F 3/0383 345/156 |

OTHER PUBLICATIONS

Apple Reveals New Multi-Dimensional GUI, Mar. 24, 2009, http://www.patentlyapple.com/patently-apple/2008/12/apple-reveals-new-multi-dimensional-gui.html.

* cited by examiner

DEVICE AND USER INTERFACE FOR VISUALIZING, NAVIGATING, AND MANIPULATING HIERARCHICALLY STRUCTURED INFORMATION ON HOST ELECTRONIC DEVICES

CROSS REFERENCE TO RELATED APPLICATION

The present application is a divisional of U.S. application Ser. No. 13/674,472, U.S. Pat. No. 9,007,302, which claims priority of U.S. provisional application, Ser. No. 61/558,572 filed Nov. 11, 2011, by Benjamin D. Bandt-Horn, which is hereby incorporated herein by reference in its entirety.

BACKGROUND OF THE INVENTION

The present invention is directed to computing hardware input devices and human-computer software interfaces. In particular, the invention is directed to handheld, position-aware pointing devices with advanced scroll wheel capabilities, and the use of the disclosed pointing and scrolling abilities to manipulate a hierarchical user data visualization on multiple host electronic devices.

The recent proliferation of disparate user accounts and services, combined with the prevalence of multiple electronic devices in a user's daily activities, makes the process of repeatedly authenticating to those many devices a cumbersome and disjointed activity. Moreover, the devices, applications and online services often have distinct methods and interfaces for user authentication as well as idiosyncratic methods and interfaces for visualizing and manipulating the accessed data, interface or service.

Computer devices, whether they be desktop, mobile, handheld, or small integrated systems, often require independent mechanisms, passwords or interfaces with which to establish and verify the identity of the current user, only thereby unlocking that user's data, files, preferences and administrative capabilities for access and manipulation by the authorized user. Several software solutions are aimed at providing universal authentication mechanisms for distributing the user's identity, credentials, and preferences among hardware devices and throughout the applications, accounts, and services hosted on those devices. Conversely, there are similar software authentication mechanisms for authenticating a user's credentials throughout applications, accounts, and services which are in actuality hosted on the internet, but presented via the currently-accessed host device. However, significantly fewer hardware-mediated authentication mechanisms exist for universal access to a user's data across a plethora of devices and locales.

Furthermore, there are few prevalent metaphors for describing, depicting, and universally manipulating generalized hierarchical data and information; the most common such method being the directory and file metaphor of typical desktop computer interfacing. Textually, hierarchies are often depicted via category and subcategory nested outlines, whitespace indentations, numerical and bullet outlines, as well as syntactically- and symbolically-delineated character strings, such as parentheses, brackets, and keywords, among other techniques that are often used to represent hierarchical encapsulations in text. These hierarchy metaphors are disadvantageous when the depth and breadth of the file-and-directory or textual subcategorization hierarchies increases beyond the capacity of typical two-dimensional visual interface metaphors such as windows, long textual documents, or physical host electronic device's display dimensions. Simply put, written documents and text hierarchies often exceed the visible extents of a single page length and width, and file-and-directory hierarchies often exceed the visible extents of a display. To work around these limitations, users typically scroll and/or layer two-dimensional windows over each other, thus occluding other directories within the hierarchy.

SUMMARY OF THE INVENTION

According to an aspect of the present invention, an improved class of input devices are provided that are characterized by a scroll wheel that presses, or detects clicks, radially from multiple directions while providing tactile or similar feedback, and an inertial measurement unit (IMU) providing the device six degrees of movement freedom, both combined variously among other components in the present invention's preferable embodiments. According to a further aspect of the present invention, user interface methods, software architecture and ornamental designs are provided that directly build from and relate to the unique capabilities in the disclosed hardware designs.

In particular embodiments the hardware comprises pen-type and ring-type designs for a class of input devices, along with the associated methods of use for both user credential authentication across various other host devices, as well as a branching fractal software interface that is suited for use with the disclosed input device embodiments, in wireless conjunction with the host devices, for the purpose of data hierarchy visualization and manipulation.

The elements of the present invention are well suited for use with each other. As such, the present invention provides a union at the bridge between the fields of hardware (device design) and software (user interface methodology), with the present invention bidirectionally providing a unique relationship, shared aspects, and interactions between the hardware and software.

BRIEF DESCRIPTION OF THE DRAWINGS

The foregoing summary of the invention, as well as the following detailed description of illustrative embodiments, is better understood when read in conjunction with the accompanying drawings, which are included both by way of example, suggestive ornamental design, and not by way of limitation with regard to the claimed invention.

FIG. 7A is an illustrative symbolic view depicting the underlying logical structure of a typical, albeit simplified example directory and file hierarchy, in which the logical structure corresponds to top view FIG. 7D, front view FIG. 7E and perspective view FIG. 7B;

FIG. 7B is an illustrative perspective view displaying an artificially small example hierarchy of directories and files depicting the hierarchy's three-dimensionality, with the depicted view corresponding to top view FIG. 7D, front view FIG. 7E and the underlying logical structure represented by FIG. 7A;

FIG. 7C is an illustrative symbolic view displaying the underlying logical structure of the simplified example directory and file hierarchy after the modification of the file at location 730, with the depicted logical structure corresponding to the front perspective view FIG. 7F, and is distinguished from the preceding state of the structure as represented by FIG. 7A;

FIG. 7D is an illustrative top down view displaying the example directory and file hierarchy, provided to illustrate the optional three-dimensionality resulting from the addition of rotation around a parent node's 710 vertical axis as a visual cue to assist hierarchy organization, with the depicted view corresponding to front view FIG. 7E, perspective view FIG. 7B and the underlying logical structure represented by FIG. 7A;

FIG. 7E is an illustrative front view displaying the example directory and file hierarchy, with the depicted view corresponding to top view FIG. 7D, perspective view FIG. 7B and the underlying structure represented by FIG. 7A;

FIG. 7F is an illustrative front perspective view displaying the example directory and file hierarchy after the modification of the file at location 730, and corresponds to the underlying structure represented by FIG. 7C;

FIG. 8A is an illustrative perspective view of how the simplified example directory and file hierarchy might be displayed, in one embodiment, with the addition of textual labels and file or folder iconography;

FIG. 8B is an illustrative complete user interface view representing how a directory, a file, and example textual computer source code hierarchy within that directory might be displayed three-dimensionally, in one embodiment, simultaneously with that example text. Three dimensional visual organizational methods may be used to visually present changes to the example text that are tracked by a version control system or source code management software application;

FIG. 9A is an illustrative view depicting how the ring-type input device, in one embodiment, allows the user wearing it to indirectly manipulate file and directory hierarchies, albeit while at some physical distance from a host computing device which presents that hierarchy on a two-dimensional display in accordance with aspects of the present invention's software architecture, interface design and methods;

FIG. 9B is an illustrative view depicting how a ring-type input device allows the user wearing it to more directly manipulate file and directory hierarchies at some physical distance from host computing devices which present that hierarchy upon a display capable of rendering three-dimensional imagery in accordance with aspects of the present invention's software architecture, interface design and methods;

FIG. 9C is a view illustrating an example set of hierarchy manipulation abilities and organizational methods made possible when using one embodiment of the present invention's software architecture, interface design and methods. This figure also illustrates user invocation of organizational methods and metadata metrics which one embodiment of the software architecture uses to determine the graphical information visualization characteristics corresponding to the contents of a hierarchy which, when rendered visually, convey metadata subtly to a user;

FIG. 9D is an illustrative detail view corresponding to a user interface detail of FIG. 9C in which an example set of hierarchy manipulation abilities, organizational methods and metadata metrics are made available for user invocation according to one embodiment of the present invention's software architecture, interface design and methods;

FIG. 9E is an illustrative detail view corresponding to a user interface detail of FIG. 9C in which an example set of hierarchy manipulation abilities, organizational methods and metadata heuristics are made available for user invocation, as in FIG. 9D, however with an alternate ornamental interface design;

FIG. 10A is an illustrative view indicating user activity that causes a portion of an example hierarchy to be removed, and the figure discloses ways in which embodiments of the present invention react, then reorganize and render a resultant hierarchy, in response to common user-initiated change;

FIG. 10B is an illustrative view which discloses several of the methods used to render the example hierarchy at various durations of time after the removal changes as illustrated in FIG. 10A, and the effects of removal upon rendering given certain example organizational sets;

FIG. 10C is an illustrative view in which one embodiment of the present invention renders non- or co-local child hierarchies, such as remote network file structures, hyperlinks within textual hierarchies, web homepages and local filesystem symbolic links;

DETAILED DESCRIPTION OF THE PREFERRED EMBODIMENTS

Particular embodiments of the wireless input devices, their utility as purveyors credentials assisting externally provided user authentication methods, and associated hierarchy visualization and manipulation interface designs, are described below with references to the accompanying drawings, in accordance with the present invention.

Figure 1A:
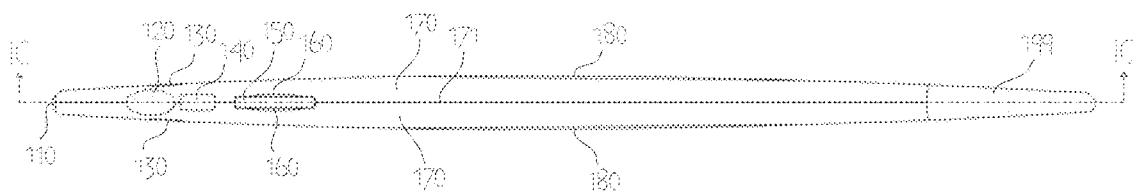
FIG. 1A is a top down view of a pen-like wireless input device in accordance with the present invention disclosing its exterior surface and visible structural and functional features, as assembled in a particular illustrative ornamental design.
Figure 1B:
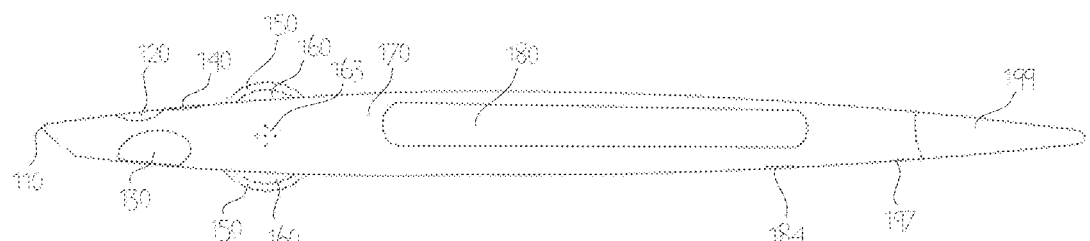
FIG. 1B is a side view of the pen-like wireless input device of FIG. 1A.
Figure 1C:
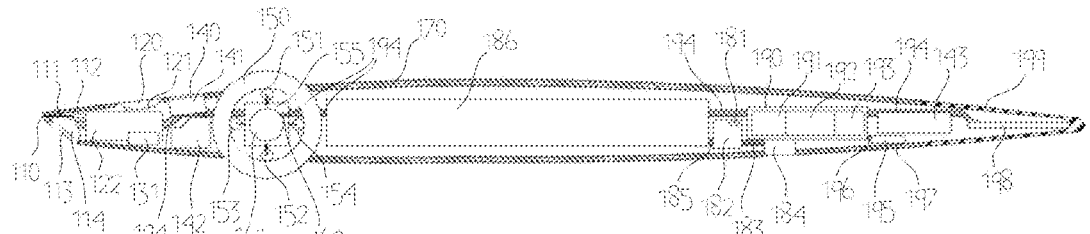
FIG. 1C is a side cross-section view of the pen-like wireless input device of FIG. 1A along the cross-section cut as noted in FIG. 1A disclosing the interior component layout, structure, and functional features of the input device.

FIGS. 1A-1C depict a pen-type input device according to an embodiment of the present invention, wherein FIG. 1A is the top exterior view and FIG. 1B is the side exterior view of the input device, which represent one illustrative ornamental design, and wherein FIG. 1C is an illustrative side sectional view of the preferred structural and functional layout of the input device's interior.

The disclosed pen-type input device preferably includes a longitudinal housing, or pen body, 170 of molded plastic or metal, for example. The pen body 170 ornamental design may be comprised of two halves, having the mirrored shape of elongated and distended concave shells, and joined along symmetry line juncture 171 for ease of manufacture. The ornamental design of the pen body 170 may include variations of the overall shape, dimensions, or location of the of the juncture 171, or may be manufactured with one integral pen body 170 and no juncture 171 for joining two halves or ends.

Alternatively, the end-to-end shape of the pen-type input device housing 170 is not limited to a longitudinal shape of gentle tapers and rounded cross-section, or the like. For example, the pen body 170 may be cylindrical shaped, with circular, oval, rectangular, or rounded-rectangle transverse cross-sectional shapes. Generally, the pen body housing 170 of the preferred embodiment will have the overall shape of an a form of elongated cylinder, with dimensions suitable for holding in a single hand of an adult or child, perhaps 6 to 20 cm, for example, in longitudinal length, and 0.3 to 3 cm in width (a suggested transverse measurement, orthogonal to the longitudinal direction), for example.

In the illustrated embodiment the pen-type input device includes a pressure sensitive tip 110 made of rubber, rubber-coated metal, a polymer, or similar material. In one embodiment, the pressure sensitive tip is mounted externally at one end of the pen body 170 and is electrically and structurally connected via the pen tip connector 111 to an electronic linear pressure sensor/actuator 112 component that is able to measure analog tip pressure information. The linear pressure sensor/actuator 112 component is preferably implemented with a compact sensor that can accurately measure pressure in at least one direction, such as with a Linear Variable Differential Transformer (LVDT), for example, or other such switch, or mechanical, electro-mechanical, capacitance-based, opto-mechanical, or piezoelectric sensor, or linear motor, moving coil, moving iron controllable actuator (MICA), or segmented spindle apparatus, or similar actuator at 112 that can sense, capture and potentially also be utilized to produce analog pressure at the pressure sensitive tip 110. The production of pressure and vibratory movement, by the linear sensor/actuator 112 at the pressure sensitive tip 110 may be used to imitate the feel of different writing surfaces and virtual surface topology characteristics as the pressure sensitive tip 110 is drawn across an external surface, such as a table top (not shown). For example, the pressure sensitivity of an LVDT or a Strain Gauge Rosette pressure sensor component at 112 would provide the pen-type input device only with information related to how forcefully the user presses the tip 110 onto a surface, with sensing ability to detect linear force and/or the force or torque in multiple directions. Alternatively, the ability to actively produce vibration, or controlled linear movement, generated at the tip 110 with the preferable embodiment's added complexity of a controllable combination linear actuator/sensor component at 112, such as a moving coil, segmented spindle or other active actuator that may have the capability to both sense and capture pressure information at the tip 110, could also actively generate the perception of writing surface features, such as bumps and other topology, by imparting the sensation of writing surface friction through controlled cyclic tip vibration, perceived when transferred to the user's hand that is grasping the preferred embodiment of the pen-type input device.

A plurality of input buttons 120, 130 for the forefinger, such as button 120, and for the thumb and middle finger or other fingers, such as button 130, are provided on one embodiment of the pen body 170. Tactile, proximity, or position sensors, encoders, or switches at 121 and 131 may be directly connected to the external input buttons 120 and 130 at switches or similar mechanisms within the pen body 170. Alternatively, the tactile, proximity, or position sensors, encoders, or switches 121 and 131 may be implemented by various electro-mechanical, electro-magnetic, optical, or solid state relay (SSR) subsystem, by a field effect transistor, or by a capacitive, a Hall-effect, or any other form of tactile sensor, or a momentary, a single pull single throw (SPST), a snap-action, or any other switch variety or button mechanism. In the illustrated embodiment, both the input button 130 and the tactile, proximity, or position sensor, encoder, or button switch 131 have a mirror duplicate on the transversely opposite side of the pen body 170 for the purpose of ambidextrous hand use, typically responsive to pressure between a thumb and middle finger. Any gap or juncture between the buttons 120, 130 and the pen body 170 would preferably be waterproof, water resistant, or otherwise sealed to prevent small particulate contamination and obstruction of movement.

As shown in FIG. 1C, a pen button controller 122, preferably implemented with a small digital signal processor, or integrated circuit, may be included to perform processing responsible for capturing finger button 120, 130 pressure signals from switches 121, 131, and for capturing pressure sensitive tip 110 input from the linear actuator/sensor 112 subsystem. In the preferred embodiment, the pen button controller 122 also actively generates haptic feedback at the pen tip 110 via the electro-mechanical connection 111 and linear encoder/actuator 112 subsystem.

In embodiments of the present invention, a biometric sensor 140 is optionally provided for at some location on the pen body 170, and is controlled by the biometric sensor controller 141. The biometric sensor 140 may be located, as illustrated in FIGS. 1A-1C, just behind the forefinger input button 120. Variously, the biometric sensor 140 and biometric sensor controller 141 may be implemented with commodity optical, capacitive, ultrasonic, or any variety of fingerprint or noninvasive biometric sensor technology. In the preferred embodiment, the biometric sensor 140 is one of two primary options for authentication to host devices and is optionally relied upon to establish the user's identity and credentials as the user travels among various host devices, as per use situations discussed in connection with FIG. 4 and FIG. 5.

An input mechanism in the illustrated embodiment resembles a typical scroll wheel 150, which consists of a torus or alternatively a similar ring or disk shape, is preferably movable, and is made of plastic, metal, glass, a rubber-coated alloy, a rubber-coated polymer, or analogous material. In the embodiment of FIGS. 1A and 1B, the scroll wheel 150 protrudes both above and below the pen body 170 from between scroll wheel guards 160. Scroll wheel guards 160 are partial disk in shape in this illustration, are flanking the scroll wheel, are made of metal, plastic, or similar material, are immobile, and are either permanently connected to or integral with the pen body 170. In the preferred embodiment, any gap or juncture between the scroll wheel 150 and the scroll wheel guards 160 would consist of a waterproof, water resistant, or similar seal, or would otherwise be small enough of a gap to prevent small particulate contamination and obstruction of any scroll wheel 150 movement, but large enough to allow the scroll wheel 150 to be rotated forward and backward (longitudinally) with respect to the pen body 170 and also large enough to allow the scroll wheel 150 to be depressed, or translated, both up and down (vertically) with respect to the pen body 170. In this method of operation, an embodiment of this input device that features a movable scroll wheel both allows the scroll wheel 150 to be rotated from above or below with various fingers of the grasping hand, but also allows the same single scroll wheel torus, ring, or disk 150 to function as one distinct button or a plurality of distinct button inputs from above, and as another, separate and distinct button or plurality of button inputs from below.

Furthermore, the input device of the preferred embodiment not only provides doubly-protruding and double button nature of the scroll wheel 150 as positioned in the illustrative ornamental design, but also provides scroll wheel detent. Detent is the mechanism and ability to resist and arrest the rotational movement of the scroll wheel 150. Rotation of the movable scroll wheel in the illustrated embodiment of the present invention may be sensed and communicated by a plurality of rotational sensors/actuators 151, 152, 153, and 154. These rotational sensors may alternatively be implemented with electrostatic motors, rotary variable differential transformers (RVDT's), opto-electrical, mechanical, magnetic, Hall-effect, or any microelectromechanical system or rotary encoding technique. The rotation of the scroll wheel 150 is detected by a plurality of rotational sensors/actuators at illustrative locations 151, 152, 153, and 154, and alternatively any suitable cardinality, orientation, stagger and layout of other, radially effective locations next to a movable scroll wheel 150 within the pen body 170. In the preferred embodiment, Hall-effect or similar sensors would be manufactured to be both operated as rotary sensors combined with the functionality of a brushless motor, stepper motor, rotary controller, or any other similar active rotational force and encoding mechanism, at the illustrative locations 151, 152, 153, and 154, and would preferably be manufactured to provide enough electro-magnetic or mechanical moment over user-initiated scroll wheel rotation so as to actively rotate and/or resist movement of the scroll wheel 150. Active autonomous scroll wheel movement control originating within one embodiment of the pen-type input device would allow the use of the scroll wheel 150 to provide a haptic, or tactile feedback, in the form of simple vibration emanating from or resisting scroll wheel 150 motion initiated by the user. The preferred embodiment would exert sophisticated and scalable powerful active rotation and resistance to rotation of the scroll wheel 150, allowing for a very precise and variable detent, as in a variable catch-release resistive torque or a similarly regulated haptic feedback that is responsive to user scrolling.

Direct synchronization of the rotational sensors/rotary actuators 151, 152, 153, and 154 is coordinated by the scroll wheel controller 155 in the illustrated embodiment. The scroll wheel controller may comprise an integrated circuit, collection of integrated circuits, digital signal processor, or other such similar electrical component able to coordinate actuator rotation, resistance to rotation and/or rotary sensor encoding.

The preferred embodiment would allow the scroll wheel controller 155 command and control over scroll wheel 150 rotation and resistance to rotation, so that the scroll wheel may behave differently depending on what particular aspects of a software interface was being manipulated by the user in a particular use situation. For example, a user scrolling to the beginning or end of a long text document may feel the scroll wheel 150 resist ever so slightly as scrolling passes over each character, resist briefly but noticeably as the user scrolls past each line of text, resist significantly at paragraph and page boundaries, or even stop rotation at the virtual page extents of such a document in software. That is to say the active electro-magnetic detent or mechanically controlled rotary "cogging" mechanisms at illustrative locations 151, 152, 153, and 154 could be variably altered by the scroll wheel controller 155 to produce a variety of notched or stuttered haptic feedback sensations, intermittent tactile sensation of resistance while scrolling (known as cogging), variably increased resistance to scrolling, or actively aided scroll rotation in either direction. Variable cogging, when controlled in conjunction with software from the host device, as in the preferred embodiment (illustrated in FIG. 4), may provide an effective means of conveying feedback to the user while he or she is scrolling through discrete values in a user interface. For example, software-controlled variable cogging may actively resist scrolling at integer-like boundaries and extents of any variable range or group presented in software, or may be used to impart a tactile sensation of surface characteristics, such as bumpiness, roughness or undulation. This micro-accurate active rotation, resistance to rotation, and rotational encoding of the scroll wheel 150 in the preferred embodiment of the pen-type input device FIG. 1 constitutes a significant advantage over the current prior art in the field of scroll wheel design.

In the illustrative embodiment of the present invention, the general function of the pen-type input device's various electrical components is coordinated by the pen controller 190 and by its subsystems. A pen controller 190 may be implemented as an integrated circuit or similar microprocessor, microcontroller, or assortment of microchips affixed to a printed circuit board (PCB), and would preferably be housed entirely within and secured to the pen body 170. In one embodiment, the pen controller may be comprised of three subsystems: an arithmetic logic unit (ALU) 191 would constitute a computational circuit that controls the pen-type input device's autonomous behavior and any programmable ability to run arbitrary software. The second subsystem of the illustrated embodiment of pen controller 190 is the system memory module 192. The memory module might consist of solid state, or other data storage medium, which could carry programmable software instructions for the ALU 191, and drivers for any other electronic components and digital subsystems required by a particular embodiment. The memory module 192 preferably is of sufficient capacity to also contain, transport and retrieve a non-trivial amount of user data, such as any digital credentials provided by external software used for authenticating to host devices, including some amount of file-and-directory data as managed by the user via host devices, and optionally some amount of audio that may be made audible or other data utilized directly by the ALU 191, or internal components of the pen-type device itself. The third subcomponent of the illustrated pen controller 190 is the inertial measurement unit (IMU) 193. The IMU may be comprised of an accelerometer, gyroscope, or similar electro-mechanical mechanism for determining the orientation, acceleration, and change of position of the IMU (and hence, the pen body in which it is housed). The IMU need not be a literal subcomponent of the pen controller 190, but the increasing prevalence of such subsystems among mobile phones and other electronic devices makes it likely that IMU 193 integration within the pen controller 190, along with memory 192 and the ALU 191 is not only possible, probable and inevitable, but also that such integration contributes to the miniaturization and economic advantages of the preferred functional and ornamental designs, and is in accordance with other, smaller embodiments of the present invention.

The pen controller 190 in one embodiment and its primary logic subcomponent, the ALU 191 could communicate with the other electrical components of the pen-type input device via an electrical control signal conduit, or system bus 194. The system bus 194 may be implemented within an integrated chipset, or as a multi-wire cable, a flexible flat cable (FFC), a ribbon cable (another form of multi-wire planar cable), a printed circuit board (PCB), or any similar multi-path electrical conduit that is able to physically and electrically couple the pen controller 190 to its subcomponents the ALU 191, the system memory 192, the IMU 193, and other electrical components present in embodiments of the pen-type device, including the button controller 122, the linear actuator/sensor 112, the biometric sensor controller 141, scroll wheel rotary sensors/actuators 151, 152, 153, and 154 (via the scroll wheel controller 155), as well as the communications- and power-related electrical components whose descriptions follow. The system bus may be structural (for example, as is a printed circuit board or integrated chipset) and, as such, may be coupled directly to the pen body 170, or alternatively the system bus may be non-structural (as in a ribbon cable or FFC), thereby floating more-or-less loosely within the pen body, and coupled directly only to the various electrical components (122, 112, 141, 155, etc.) which, in turn, would therefore need to be coupled to and supported by the pen body 170 directly.

Preferable embodiments of the pen-type input device are powered by an integrated charge storage device 186 composed of an electrochemical battery cell, a collection of battery cells, or some similar mechanism with which to store and discharge electrical power to the pen's electrical components, and may either be removable or integral to the pen body 170. The electrical capacity of the charge storage device 186 may be mediated and controlled by a regulated power supply 182. The regulated power supply could alternately consist of an integrated circuit, a voltage regulator, bus or similar conduit for routing electricity to the input device's electrical components. In the preferred embodiment, the regulated power supply 182 has direct electrical connection 185 to the charge storage device 186, another direct connection 183 to a charge/data port 184, and another two direct connections 181 (and mirror transverse duplicate connection 181) to two passive charge collectors 180, such as solar panels, on either side of the pen body, as well as conduits to power the main system bus 194. The charge/data port 184 is preferably a metal universal serial bus (USB) connector, mini-USB connector, micro-USB connector, or similar data port that is also able to carry a charge and able to bring the charge storage device 186 up to capacity. The charge/data port may be mounted to the pen body 170 and be accessible through an opening at the bottom of the pen body, as in the illustrated ornamental design. Any such opening or port 184 in the pen body may be fitted with a waterproof seal, water resistant rubberized plug, or similar membrane, thus preventing internal electrical components from being adversely exposed to external moisture. In an embodiment providing passive charge collectors 180, they may variously be composed of solar panels, to be mounted externally, and similar or other passive electromagnetic charge collectors mounted internally or externally, such as electromagnetic induction contactless energy transfer mechanisms. In the illustrated embodiment, two photovoltaic charge collectors, or solar panels 180, are more-or-less planar, and are mounted in large voids on either side of the pen body 170 in a tight coupling with said housing, so as to make themselves and their juncture to the pen body waterproof, water resistant or similarly sealing the photovoltaic charge collector-pen body juncture from unwanted particulates and exterior moisture. Alternatively, the two photovoltaic charge collectors 186 may be externally mounted to depressions in a (therefore mostly voidless) pen body 170, with only the smaller photovoltaic charge collector-regulated power supply connections 181 piercing the integrity of the pen body 170 housing. As per the illustrative ornamental design FIGS. 1A-1C, the passive charge collectors 180 are positioned on either side of the pen-type input device, so that one is fully able to collect light when the input device is set down to rest on either side of the pen body. Furthermore, the photovoltaics are positioned substantially behind (longitudinally along the pen body away from the tip 110) the primary hand grasping area of the pen body, such that they may also collect some light while the input device is being held.

Additionally, the illustrated embodiment could provide mechanisms that allow for the active rotation and resistance to rotation of the scroll wheel 150, whether they be electromagnetically, mechanically or otherwise implemented, to also allow the forces of user-controlled scroll wheel rotation to be harvested as electrical current at rotary sensor/actuators 250, and this captured electrical current could be used to recharge the integrated battery 186 of the pen-type input device. In such an embodiment, the scroll wheel controller 155 may be capable of harvesting electrical charge from scroll wheel 150 rotation, via rotary sensor/actuators 151, 152, 153, and 154, allowing the scroll wheel controller 155 to preferably be capable of delivering a recharge to the charge storage device 186 directly, or via the regulated power supply 182. This active resistance to rotation of the scroll wheel 150 by the rotary sensor/actuators and scroll wheel controller 155 in the preferred embodiment of the present invention constitutes yet another significant advantage over the current prior art in the field of scroll wheel design.

The pen-type interface device may alternatively include a vibrating alert motor 142 comprised of an electric motor with unbalanced weight, or similar device, mounted directly within the pen body 170, and physically and electrically connected to the pen controller 190 via the system bus 194. Embodiments of this alternate, less sophisticated variation might produce short, metered bursts of vibration from the vibrating alert motor 142, used to mimic the tactile sensation of a true cogging scroll wheel 150. In the illustrated ornamental design, the relative location of the vibrating alert motor 142 within the pen body 170 both assists in delivering vibration directly to the user's hand at the most commonly graspable area of the input device, and helps to offset the weight of other components within the pen body, by moving the center of mass forward.

In some embodiments, the pen-type input device includes a number of other electrical components situated along the system bus 194 for the purpose of facilitating indirect communication with the user, the environment, and host devices. In the illustrative ornamental design disclosed, two loudspeakers 161 are provided (one as depicted, and one at a transversely mirrored location on the opposite side laterally) for the reproduction of stereo sound or mono alerts only to the upward-facing loudspeaker. The loudspeakers are comprised of any suitable speaker driver, collection of drivers, or any other suitable electroacoustic transducer, mounted inside the pen body 170. In the preferred embodiment, the pen controller 190 converts audio data stored in system memory 192 or alternatively audio data streamed via wireless communication with host devices (as per use situations in FIG. 4 and FIG. 5) into electrical currents received by the loudspeakers via the system bus 194 or loudspeaker leads (or wires) 162, so that the loudspeakers 161 generate sounds audible to nearby users through loudspeaker apertures 163. In the preferred embodiment, although loudspeaker apertures 163 may pierce the pen body 170, they may also be sealed with a waterproof membrane or other such moisture-resistant seal, so as to prevent external contamination from entering the pen body while still allowing an adequate audio fidelity to pass through and be reproduced at distance outside of the pen body.

In addition to any non-tactile user communication facilitated by the loudspeakers 161, embodiments of the pen-type input device may include a microphone 195 which is comprised of any suitable acoustic-to-electric sensor, whether electromagnetic, capacitance-based, piezoelectric, or optoelectrical in function. In the illustrated embodiment, the microphone 195 is mounted to the inside bottom rear area of the pen body 170, and is electrically connected to the pen controller 190 via the microphone leads (wires or similar data bus) 196. Sound input may be sensed via microphone apertures 197 through the pen body. The interior of the pen body is protected with a waterproof membrane or other water-resistant seal, to prevent external moisture and particulates from entering through such apertures while still allowing sound to pass through. In the illustrated ornamental design, the microphone 195 and microphone apertures 197 are located toward the bottom, longitudinally away from the loudspeakers 161 and hand hold area of the pen body so as to adequately capture the user's voice both when grasped when the pen-type input device is held to the side of the user's head, in a manner similar to a telephone handset.

Heretofore the various tactile sensations that an embodiment of a pen-type input device generates, including a linear pressure sensor/actuator 112, rotary sensor/actuators 151, 152, 153, and 154 capable of moving the scroll wheel, as well as the loudspeakers 161 and microphone 195, have all contributed to input-device communication with users, but a pen-type input device in accordance with the present invention, may also require a means for communication to host devices, other mesh and peer group pen input devices nearby, or other devices. For inter-device communication, the illustrated embodiment provides for a wireless communications controller 143. A wireless communications controller 143 may be mounted to the interior of the pen body 170 that it may be physically and electrically connected to the pen controller 190 via the system bus 194. The wireless communications controller 143 may be variously implemented as an commercially available integrated circuit, such as a Wifi controller, Bluetooth controller, cellular controller, line of sight, free-space optical networking chipset, or any similar chipset that is able to negotiate command and control communications between the pen controller, peer devices, and host devices, both by preparing those electrical command and control signals for transmission to host devices, and by decoding incoming command and control transmissions for interpretation by the pen controller. The wireless communications controller 143 is also physically and electrically connected to the wireless antenna 198 via the system bus 194, but may alternately be so connected via a similar, yet dedicated connection. The wireless antenna 198 is comprised of an electrical device that is able to conduct and receive radio or other wireless transmissions. The wireless antenna 198 is one antenna or a plurality of omnidirectional radio antennae that are mounted to the interior of the pen body 170. Alternatively, the wireless antenna 198 or antenna array may be integral with the pen body 170, and may use all or a portion of the pen body to facilitate wireless radio transmission. A subsection of the pen body 170 as illustrated is formed with a different material, such as a polymer, that provides a less obstructive physical medium to the radio waves transmitted via the wireless antenna 198. This subsection of the pen body 170 that may be more "porous" to a desired range of the EM spectrum is called the wireless antenna housing 199 in this illustrative embodiment. Wireless transmission with the host devices could optionally be accomplished with optical line of sight transmission and reception, or by similar non-radio wave based wireless communications components that may be well benefited by being situated at the location of antenna housing 199, relative to the pen body.

A pen-type input device in accordance with the preferred embodiment of the present invention, further includes an optical surface sensor 114, which would be comprised of a light-emitting diode (LED), an infrared laser diode, or a similar light source operating in conjunction with an opto-electrical sensor, such as a complementary metal-oxide-semiconductor (CMOS) analog image sensing integrated circuit, charge-coupled device (CCD), or other similar sensor capable of interpreting and converting the movement of the pen-type input device relative to the surface over which it moves. The illustrated optical surface sensor 114 is connected to the pen controller 190 physically and electrically via the system bus 194. This optical surface sensor is similar to various technologies typically found in optical mice-type input devices. The optical surface sensor 114 is mounted at the front end of the pen body 170 interior, in an opening sealed by a protective lens 113. The protective lens 113 is comprised of a glass, translucent polymer, or other similar material and, as in the illustrated ornamental design, is preferably mounted at an angle relative to the length pen-type device such that the protective lens 113 rests flat or nearly-flat upon a table or similar surface, when the pen body 170 is grasped as one would grasp a traditional writing utensil. The juncture between the protective lens 113 and the pen body 170 is preferably integrated in such a way as to be waterproof, water-resistant, or otherwise moisture- and particulate-resistant, so as to maintain the integrity of the pen-type input device's interior.

Many of the components listed in regard to the above discussed pen-type input device embodiment above have a strong manufacturing and design trajectory to support their integration and sublimation into a unified pen controller's 190 integrated circuit logic. For example, integration of either the optical surface sensor 114, the biometric sensor controller 141, the button controller 122, the scroll wheel controller 155, the regulated power supply 182, the charge/data port 184, the wireless communications controller 143, or any combination or sets of combinations among the disclosure's components, into the pen controller 190 or into other subsystems should be considered part of this disclosure, and embodiments including these combinations may precede, follow, or supplant the illustrated organizational structure in any manufacture of the preferred embodiment.

Consistent with the trajectory of component integration within the pen-type input device mentioned above, the miniaturization and integration of several key components from the pen-type input device of FIGS. 1A-1C, combined with increasingly economical availability of microelectromechanical systems (MEMS) for many of the aforementioned components, will precipitate the manufacture of an alternative embodiment of the present invention, namely, the ring-type input device of FIGS. 2A-2F.

Figure 2A:
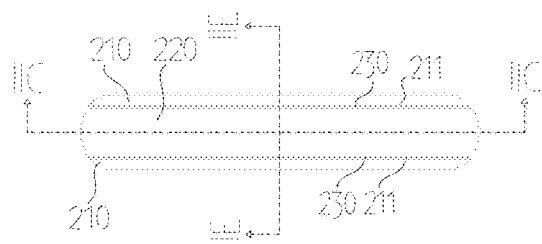
FIG. 2A is a top down view of a ring-like wireless input device in accordance with another aspect of the present invention disclosing its exterior surface and the visible structural and functional features, as assembled in a particular illustrative ornamental design.
Figure 2B:
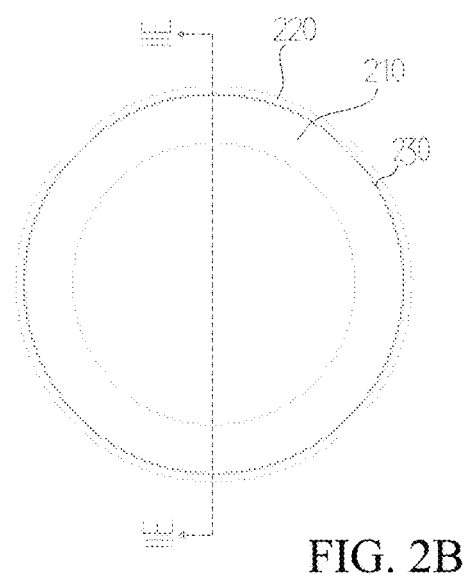
FIG. 2B is a side view of the ring-type wireless input device of FIG. 2A.
Figure 2E:
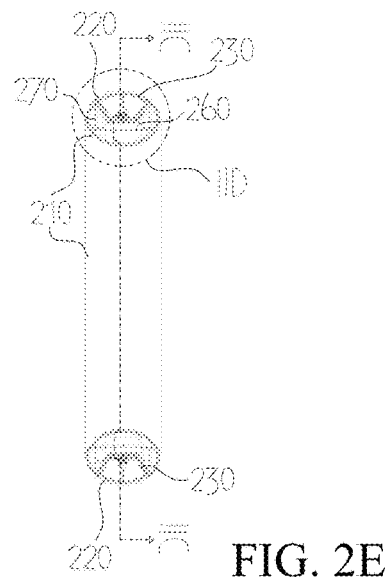
FIGS. 2D and 2E are transverse side cross-section detail views of the ring-type wireless input device of FIG. 2A taken along the cross-section cut as noted in FIG. 2B, with FIG. 2D being a close up detailed view of the portion noted in FIG. 2E.
Figure 2C:
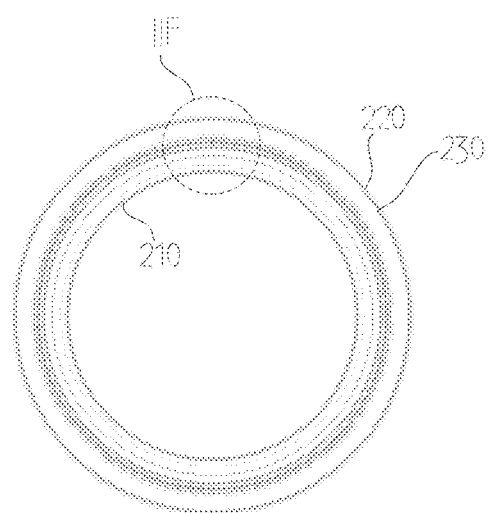
FIG. 2C is a lateral side cross-section view of the ring-like wireless input device of FIG. 2A along the cross-section cut as noted in FIG. 2A disclosing the interior component layout, structure, and functional features of the input device.
Figure 2D:
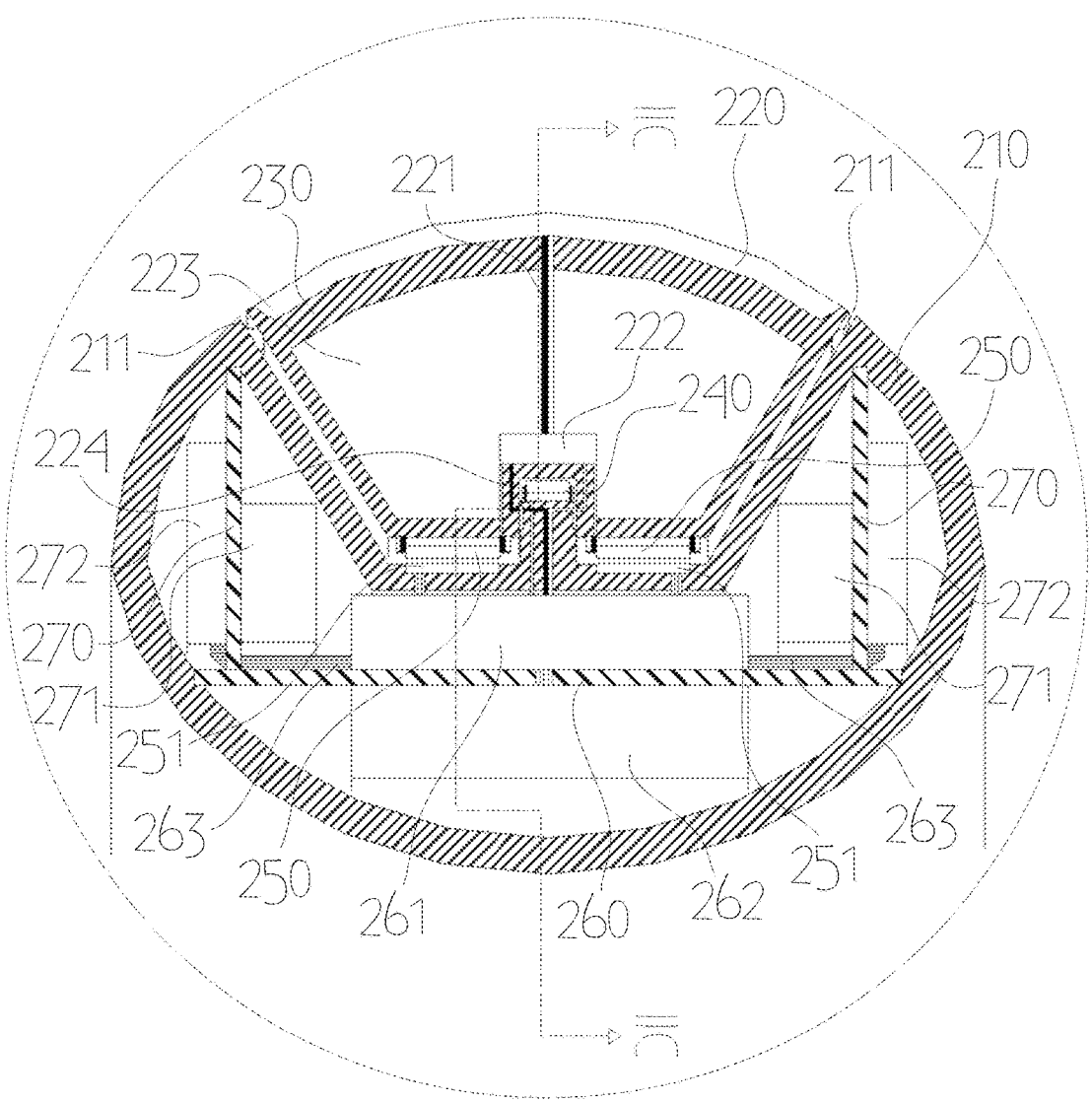
Figure 2F:
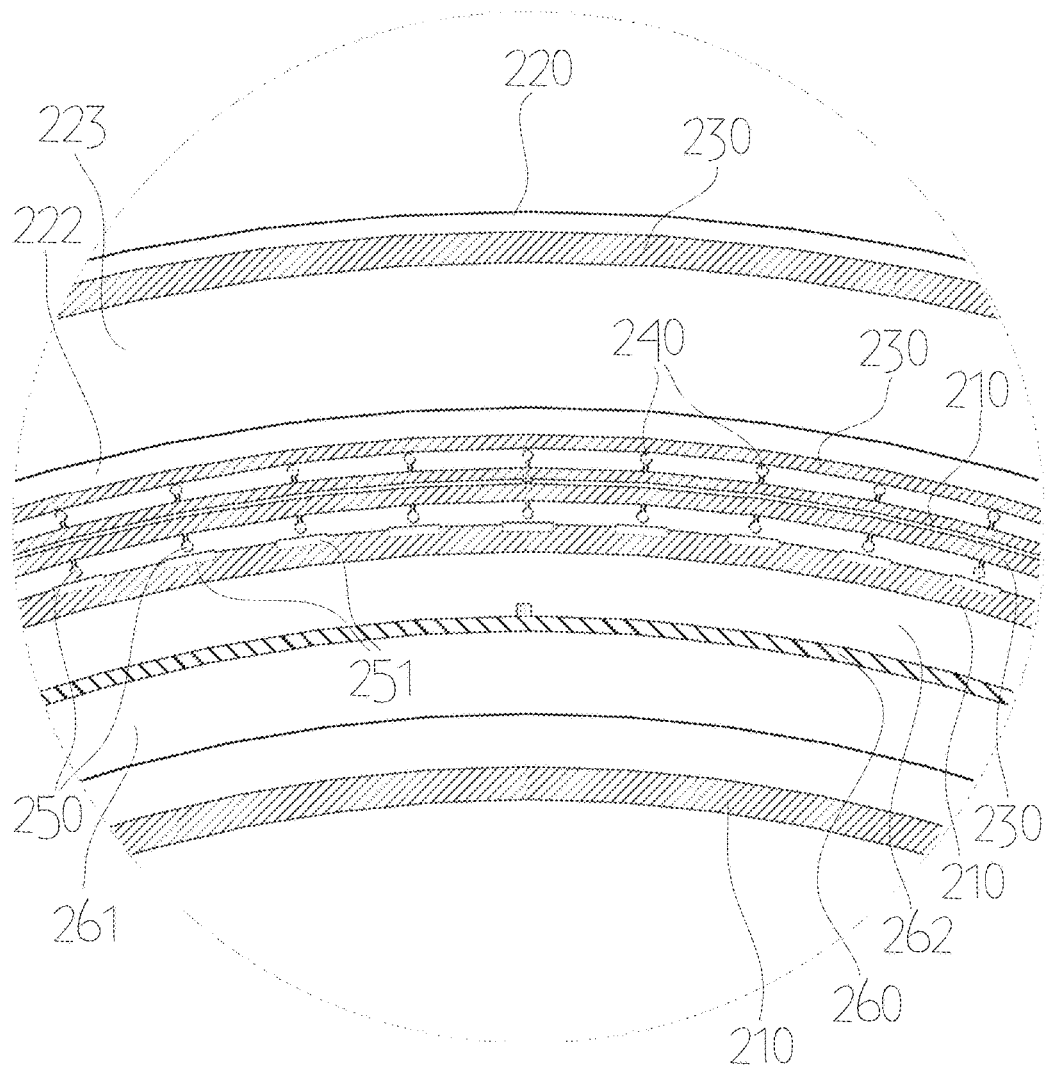
FIG. 2F is a close up detailed partial lateral side cross-section detail view of the ring-type wireless input device of FIG. 2A of the portion noted in FIG. 2C.

FIGS. 2A-2F disclose a ring-type input device according to an alternative embodiment of the present invention wherein FIG. 2A is the top exterior view of the input device, FIG. 2B is the side exterior view representing an illustrative ornamental design, FIG. 2C is an illustrative side cross-sectional view of the preferred structural and functional layout of the input device's interior, FIG. 2E is a transverse cross-sectional view of the preferred interior, FIG. 2D is a detail view of sectional view FIG. 2E, and FIG. 2F is a detail view of side sectional view FIG. 2C.

The ring-type input device of one embodiment is mostly comprised of a toroidal, or partial torus housing, known as the ring body 210. The ring body is preferably made of molded or machined metal, polymer, ceramic, silicon or similar material. The ring body 210 ornamental design may consist of several variations of toroidal shapes, and of a range of sizes appropriate for wear on a finger of a human adult or child. The ornamental design of the ring body 210 may include variations of the surface smoothness, dimensions, uniformity, or overall shape of the transverse sectional profiles of more-or-less toroidal housings.

Besides the ring body 210, a preferred embodiment of the ring-type input device further includes a convex passive charge collector 220. The convex passive charge collector 220 occupies much of the device's visible exterior when the ring-type device is worn and may constitute the outermost half surface of the toroidal shape. As with the photovoltaic collectors 180 of the first embodiment, the convex photovoltaic collector 220 is composed of a solar panel, a plurality of solar collectors, photovoltaic cells, or other similar passive wireless, inductive electromagnetic charge collectors. In one embodiment, the convex photovoltaic collector is securely affixed to the scroll wheel body 230, which rotates freely relative to a stationary ring body 210, and is physically and electrically connected to other internal components which will be mentioned shortly.

The scroll wheel body 230, in one embodiment, rotates freely around and may be constrained in terms of movement extent by the ring body 210. The scroll wheel body 230, like the ring body 210, could be composed of metal, polymer, ceramic, silicon or similar material, and may constitute a structural element supporting other internal components, occupying some fractional remainder void of the interior of the overall toroidal shape,'s interior space, the outermost surface of the shape which is defined by the convex photovoltaic collector 220 and ring body 210.

In one embodiment, a juncture or gap between the ring body 210 and the scroll wheel body 230 is preferably protected by a weather seal 211. Weather seal at location 211 consists of a membrane, double membrane, hydrophobic material, lubrication or similar mechanism, such that the void between the ring body 210 and scroll wheel body 230 be waterproof, water-resistant, hydrophobic or otherwise moisture- and particulate-resistant so as to maintain the integrity of the ring-type input device's interior, while still allowing scroll wheel body 230 rotation with minimal friction.

The scroll wheel body 230 contains a primary charge storage device 223 in the illustrated embodiment. The primary charge storage device 223, much like the charge storage device 186 in pen-type input device embodiments, may be composed of an electrochemical battery cell, a plurality of battery cells, or some similar mechanism with which to store and discharge electrical power.

In the illustrated embodiment of the ring-type input device, the scroll wheel body 230 encloses the charge storage device 223, as well as a regulated power supply 222. The regulated power supply 222, as with the regulated power supply 182 of the pen-type input device, may consist of an integrated circuit, a voltage regulator, or simply a specialized bus or similarly promoted conduit for routing electricity to the ring-type input device's electrical components. The regulated power supply 222 as illustrated is physically and electrically connected to the convex photovoltaic collector via a plurality of photovoltaic leads 221, is physically and electrically connected to the surrounding primary charge storage device 223, and is also physically and electrically connected to other electrical components within the ring body 210 via the wheel-ring charge connection 224. In one embodiment, the wheel-ring charge/data connection 224 could allow electrical power to pass from the free-rotating scroll wheel body 230, and all the power-related components housed therein, on into the ring body and all the logic-related components housed there. The wheel-ring charge/data connection 224 could be implemented with a physical or non-physical electromagnetic connection, or similar electrical conduit which minimizes friction between the freely rotating scroll wheel body 230 and the relatively stationary, user graspable ring body 210.

A plurality of rotary sensor/actuators 240 and 250 comprise a physical similarity between the ring body and the rotary sensor/actuators near scroll wheel body 150 of pen-type embodiments. Just as the rotary sensor/actuators 151, 152, 153, and 154 of the pen-type input device's preferred embodiment of FIG. 1C are used to detect and produce rotation, software-controlled detent, and plausibly also harvesting electrical charge to assist in powering the device, a similar plurality of rotary sensor/actuators at 240 and 250 are used to encode and preferably drive the rotation of the scroll wheel body 230. The sensor/actuators at 240 and 250 could be implemented with a plurality of mechanisms such as electrostatic motors, with rotary variable differential transformers (RVDT's), by opto-electrical, mechanical, magnetic, Hall-effect, or any microelectromechanical system or rotary encoding technique. Rotation of the scroll wheel body 230 may therefore be detected by a plurality of Hall-effect sensors 240 and capacitor actuators 250, or any number of alternative sensor and actuator types. In other embodiments, any number of similar structural layouts and placement arrangements are possible, including staggering, irregularly-spaced combinations of sensor/actuators, including a single sensor with multiple actuators, single actuators with multiple sensors, any imbalanced plurality of sensors and actuators, while still achieving analogous functionalities in accordance with the present invention. The locations, orientations, cardinality, and regularity of the interspersed positions of the sensor/actuators 240 and 250 is illustrative, and their actual locations, orientations, cardinality and dispersion depend primarily on the choice of aforementioned sensor/actuator 240 and 250 technology type and current miniaturization, the strength of an individual actuator, and so forth. Some alternate layouts and implications upon the ornamental design and toroid ring body shape due to the selection of other sensor types and miniaturization levels are expounded upon as illustrative embodiments in FIGS. 3A-3E. The choice of sensor 240 or actuator 250 implementations and specific choices for internal ring body 210 and scroll wheel body 230 structure may also be dictated by manufacturing, mechanism form and size, or power-consumption constraints, and should also be considered well represented by the present disclosure. As mentioned, a limited number of the many plausible embodiment variations of the present invention are suggested in FIGS. 3A, 3B, 3C, 3D, and 3E.

The ring-type input device's preferred embodiment take the form of a more-or-less toroidal, human finger wearable/graspable ring body 210 and scroll wheel body 230 capable of detecting and wirelessly transmitting its physical rotation and user finger presses in the area of the passive charge collector 210 if provided. The scroll wheel body may physically move in some embodiments, or is alternatively stationary, but capable of detecting the finger position due to resultant capacitance, piezoelectricity or similar touch-detection, and also detect user attempts to physically rotate that the outermost surface of the wearable torus as if it were a free-rotating physical scroll wheel. For example, a touch sensitive convex capacitance surface or a touch sensitive display screen 520, in the location of, or alternatively, integral with a convex passive charge collector 220, could detect the user's efforts to rotate the outer surface of the torus 220, although no actual physical rotation to the scroll wheel body 230 or pen body 210 would need actually be imparted. As an example in accordance with a touch-sensitive embodiment, a ring-type input device FIG. 3B, FIGS. 3E and 3D is comprised of a torus-shaped ring body 310 with no moving parts, and may also be outfitted with an integrated touch sensitive colocated display screen 320, with a touch/display controller 321 enabling detection of rotational surface finger gestures around a touch sensitive extremity of the toroidal shape.

Figure 3A:
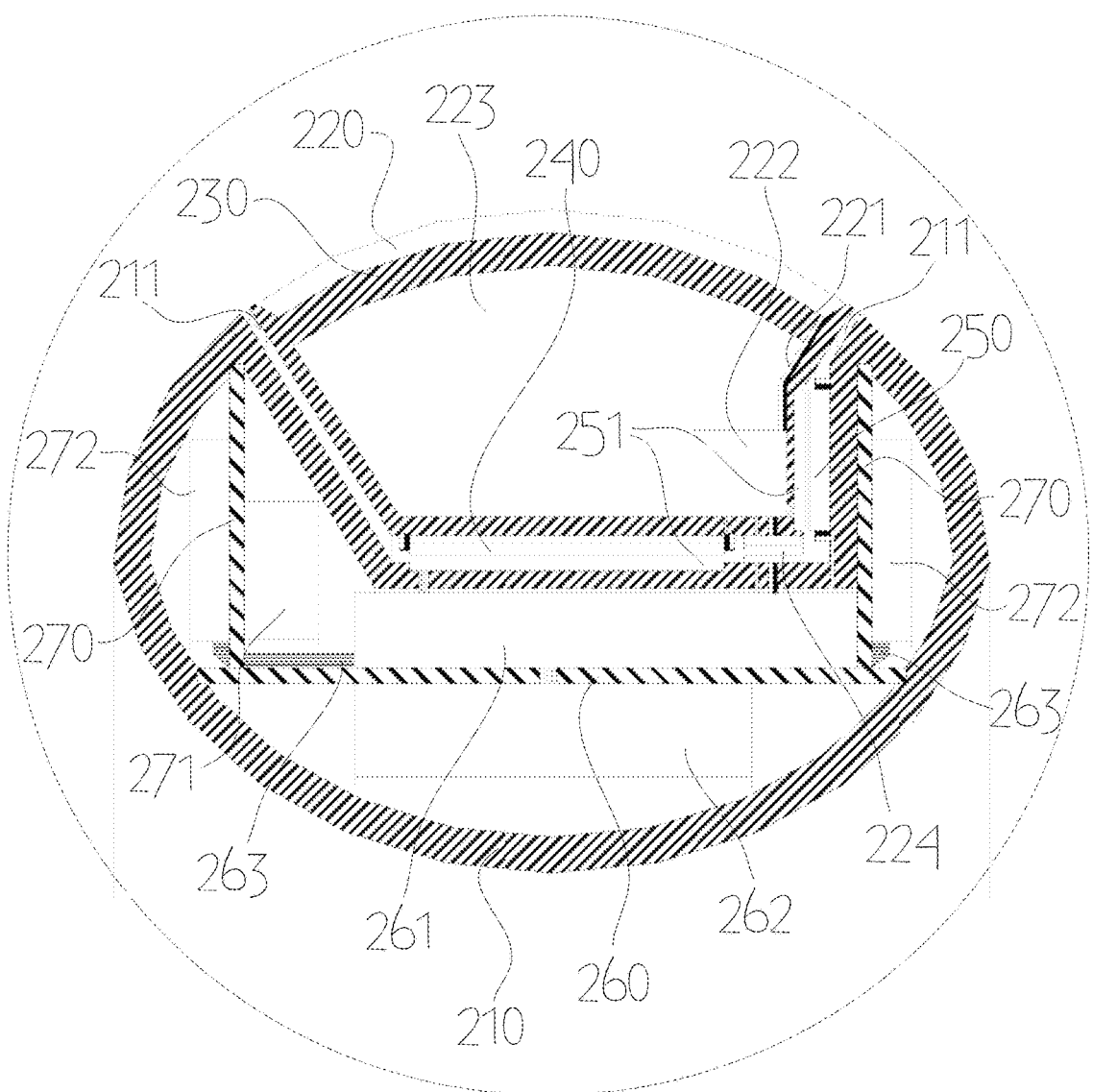
FIG. 3A is a transverse side cross-section detail view of an alternative ring-type input device in accordance with an aspect of the present invention corresponding to the detail view FIG. 2D and disclosing an alternative arrangement of the interior functional components, which arrangement may or may not alter the exterior visible ornamental design.
Figure 3B:
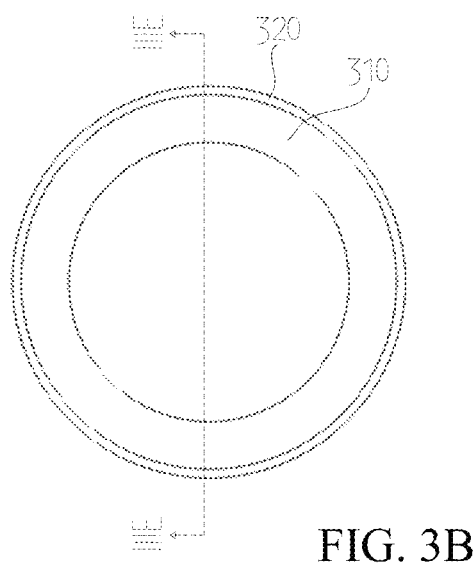
FIG. 3B is a side view of still another embodiment of a ring-type input device in accordance with an aspect of the present invention in which the moving components, namely the scroll wheel body and its associated sensor/actuators, are replaced by a capacitive touch screen display which assumes all of their scroll and click input functionality.
Figure 3E:
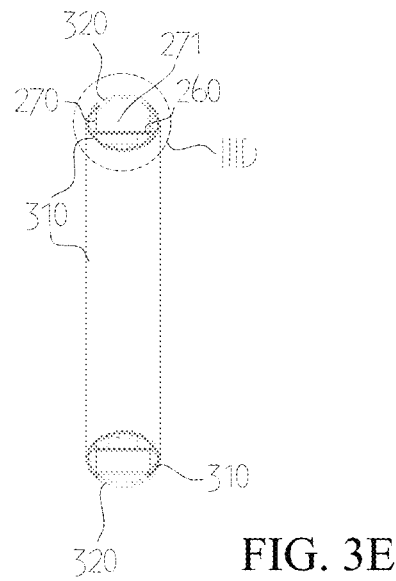
FIGS. 3D and 3E are transverse side cross-section detail views of the ring-type input device of FIG. 3B, with FIG. 3D being a close up detailed view of the portion noted in FIG. 3E.
Figure 3C:
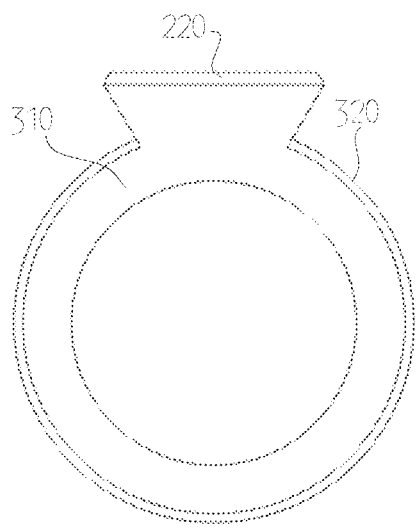
FIG. 3C is a side view of yet another embodiment of a ring-type input device wherein functional components of the device are contained within a housing external to the toroidal ring shape and structure relative to the embodiment of FIG. 2A.
Figure 3D:
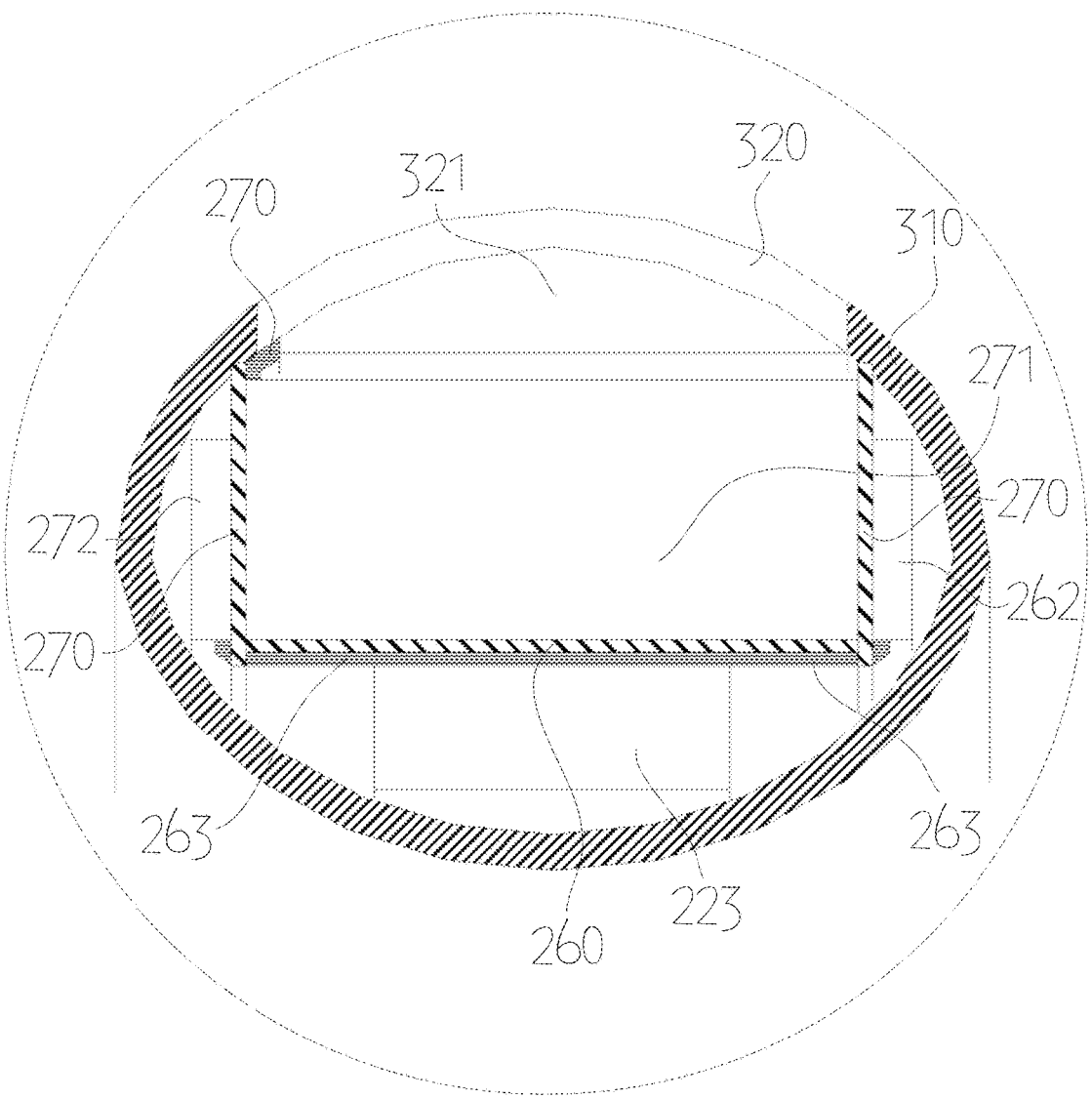

Alternative embodiment variations of specific sensor/actuator placement are suggested in FIG. 3A, but there are an infinite number of similar internal component orientation and placement variations that are functionally equivalent, plausible, and, as impossible to enumerate, therefore should be considered alternate embodiments in accordance with this disclosure.

In an illustrated embodiment, the rotary actuators 250 are mounted to the scroll wheel body 230 portion of the ring-type input device and are physically and electrically connected to a regulated power supply 222, that they may be driven via electrical commands and current directed by the regulated power supply 222 and generated by the primary charge storage device 223, which are closely co-located within the scroll wheel body 230.

Alternately, the rotary sensors 240 are mounted to the ring body 210 portion of the ring-type input device and could be physically and electrically connected to the electrostatic sensor controller 262. The electrostatic sense controller 261 may be implemented as an integrated circuit or similar microprocessor, microcontroller, or assortment of microchips that are connected electrically and physically to a cylindrical circuit 260. The cylindrical circuit 260 would then be alternatively comprised of a printed circuit board (PCB), a multi-wire cable, flexible flat cable (FFC), system on a chip (SoC), or any similar multi-path collection of electrical conduits, or integral chipset with 261 and/or 262 and other internal components whose placement is able to follow the curvature inside the toroidal shape of the ring body 210. The electrostatic sense controller 261 may also be physically and electrically connected to a plurality of micro-stepping drivers 251. The micro-stepping drivers 251 could be composed of integrated circuits, microelectromechanical systems (MEMS), or a similar sensor, encoder or resolver mechanisms able to precisely sense and manipulate the proximity of the rotary actuators 250. The electrostatic sense controller 261 in this illustrated embodiment is affixed securely to and entirely within the ring body 210.

In one embodiment, the cylindrical circuit 260 is connected physically and electrically to the other electrical components within the ring body 210 via the transverse system bus 263 which may be composed of a multi-wire cable, flexible flat cable (FFC), or any similar multi-path collection of electrical conduits. The transverse system bus 263 is connected physically and electrically to the flat circuits 270. The flat circuits 270 are alternatively comprised of printed circuit board (PCB), or any similar multi-path collection of electrical conduits upon a semi-structural substrate, or a chipset with integral components, multi-path electrical conduits and structure. The flat circuits take the form of flat disk shapes with hollow centers, squat-walled cylinders, coinciding with and fitting within the interior shape of the ring body 210. In several plausible embodiments of flat and cylindrical circuit substrates 270 and 260, respectively, as per FIG. 3, the flat circuits 270 often provide an easier substrate for mounting the various circuits and subsystems that are not as easily or economically mountable upon the cylindrical circuit 260.

An appropriate choice for circuitry and subcomponents to be mounted on the cylindrical circuit 260 includes the electrostatic sense controller 261 an components associated with scroll wheel rotation, and those subsystems of the ring-type can be implemented with a plurality of parallel controllers, integrated circuits, or other radially arranged divisible logic elements, and communicates with the sensor/actuators and micro-stepping drivers 251 that are similarly arranged radially. Another appropriate choice for circuitry and subcomponents to be mounted on the cylindrical circuit includes the wireless communications antenna 262. The wireless communications antenna, similar in function to the wireless communications antenna 198 of the pen-type input device embodiment, is more easily expressed within toroidal shape constraints, and furthermore could be implemented with an array of parallel antenna subcomponents (a multiple input multiple output antenna, or MIMO antenna array, which arrange radially with relative ease). The illustrated embodiments of FIGS. 2D and 3D, of example ring-type interface devices including ring bodies 210 that contains a wireless communications antenna 262 physically and electrically connected to the cylindrical circuit 260 and physically and electrically connected to the other electrical components by one or a plurality of transverse system buses 263.

An appropriate choice for circuitry and subcomponents to be mounted on the flat circuits 270, in some embodiments, include user solid state memory and data storage 272, as the solid state memory and data storage 272 is somewhat analogous to the system memory module 192 subcomponent of the pen controller 190 of the first, pen-type embodiment, and is most likely economically implemented with widely commercially available solid state storage circuitry, which is typically manufactured for mounting to a flat circuit 270 substrate, such as on a printed circuit board or system on a chip, and/or in miniaturized cuboid forms.

Another appropriate choice for circuitry and subcomponents to be mounted on the flat circuits 270 of some embodiments includes the ring controller 271 which is optionally comprised of many of the circuits and subsystems that expressed themselves separately in the first embodiment pen-type input device, miniaturized as an integral chipset or unified system-on a chip, optionally including the scroll wheel controller 155, the loudspeaker 161, the microphone 195, the wireless communications controller 143, and the functionality of the pen controller 190 and its various subsystems: the arithmetic logic unit (ALU) 191, system memory module 192, and inertial measurement unit (IMU) 193, and optionally the biometric sensor controller 141. These are subsystems and circuits whose cost of development and manufacture are most likely to be significantly more economical if they can be mounted as flat circuits 170, a single system on a chip, or similar integration. Due to the integration of so many of these disparate subsystems from the first embodiment into the ring controller 271, much of the structure and functionality of the first embodiment, pen-type input device's system bus 194 would also need to be integrated into the ring controller 271 of the second embodiment. Accordingly, the ring controller performs all the purely computational command and control sensor/actuator processing, tactile feedback and host device communications, which, in the pen-type device embodiment, may have been handled separately by (perhaps off-the-shelf, commonly available) discrete subsystems. In the illustrated embodiments of these input devices, the pen controller 190 and the ring controller 271 should be considered whole computers in their own right, yet alternatively both embodiments of the present invention could subsist on, and still provide the claimed functionality with relatively unsophisticated integrated circuits at 190 and 271 that simply route relatively raw sensor output into wireless transmission for interpretation and processing executed as software on the host device. A fully integrated pen controller or ring controller could directly effect active rotation and resistance to rotation upon their respective scroll wheel 150 or scroll wheel body 230 in those embodiments and ornamental designs that express a movable scroll wheel, preferably variable in tactile resistance and in response to wirelessly communicated instruction from the host devices. Thus, capabilities for preferred embodiments of pen controllers 190 or the ring controllers 271 is an ability to encapsulate or prepare their respective button, scroll, sound, position or other sensor data for communication to the host device, and in exchange receive loudspeaker audio data and tactile, haptic, or cogging feedback data which would trigger active rotation and resistance to rotation cogging sequences for in such embodiments of scroll wheel 150 and scroll wheel body 230 in which active computational control of the scroll wheel is possible. Similar haptic feedback communication from host devices could comprise command sequences to optional vibrating alert motor in those embodiments that imitate cogging sensations. Chipset solutions for pen controllers 190 and ring controllers 271 ranging in complexity from embedded system circuitry to full general purpose programmable subsystems are in accordance with embodiments of pen and ring input devices, because said systems satisfy both sensor communication to a host device and haptic feedback to a user grasping the device. Further progressions toward the miniaturization of ring 271 and pen controllers 190 constitute expected future embodiments of these devices. for example, in embodiments that do not express movable scroll wheels, such as FIG. 3B, FIG. 3E, FIG. 3D, and FIG. 3C, a convex capacitive touch sensitive display at illustrative location 320 is employed as an alternate method for providing scrolling input to the pen controller 190 or ring controller 271. In these alternative touch screen embodiments, the computational costs of processing capacitive touch touch-responsive surface 320 sensor output and simultaneously generating some graphical output on the touch-responsive surface visual display 320 would be higher. Any embodiments exhibiting graphics output capability from the touch-responsive surface 320 would necessitate graphical capabilities within the pen controller 190 and ring controller 271. These components may comprise full computer systems, embedded systems, or systems on a chip, and in such embodiments would subsume many correlated computer system design and prior art considerations entirely within the design of the respective controller components 190 and 271.

In the case of alternate embodiments that employ capacitive touch sensitive surfaces or displays 320 which do not also express movable scroll wheels 150 or 230, there would not exist physically active rotation, rotation resistance, detent, nor mechanical scroll wheel 150, 230 cogging. Scroll wheel cogging would not be possible directly in such embodiments, but may be imitated via tactile sensation. In one embodiment, the impression of physical detent is imitated by employing the aforementioned vibrating alert motor 142, any miniaturized analog to the vibrating alert motor tailored to the size constraints of a ring-type input device, or alternatively any other imitated or inferred cogging, such as an audible detent from the loudspeaker 161 or visible feedback on a display capable touch-responsive surface 320. In some embodiments, an appropriately ring-scaled vibrating alert motor 142 would imitate physical detent by being activated in short, controlled bursts, and/or visual or audible feedback could constitute imitated cogging and convey scrolling detent in embodiments of the pen- and ring-type input device, in accordance with the present invention. Alternatively, there are certain capacitive touch-responsive surface 320 technology options that are capable of adjusting the tactile sensation of their surfaces electrically or otherwise, thus sufficiently imitating a tactile surface sensation similar to an physical rotation detent or vibrating alert motor, in accordance with the present invention.

Mobile Credentials and User Authentication

Figure 4:
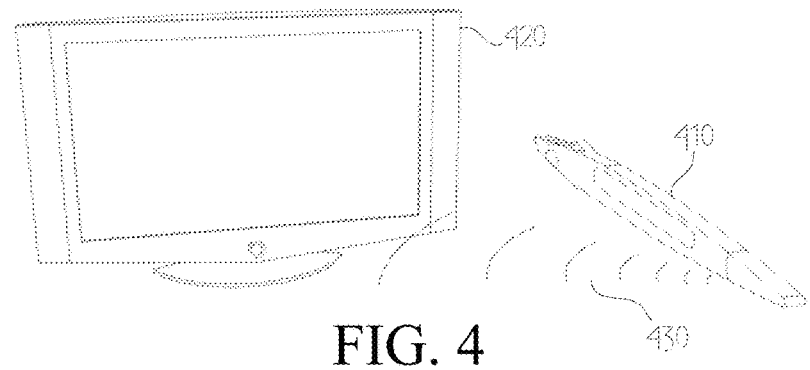
FIG. 4 is an illustrative view showing a use situation in which a pen-type input device is being used, by being held by a user's hand (not shown), in wireless conjunction with a host computing device, such as a television, music player, tablet computer, laptop computer, desktop computer, cellular telephone, or any similar host device with information processing capabilities.
Figure 5:
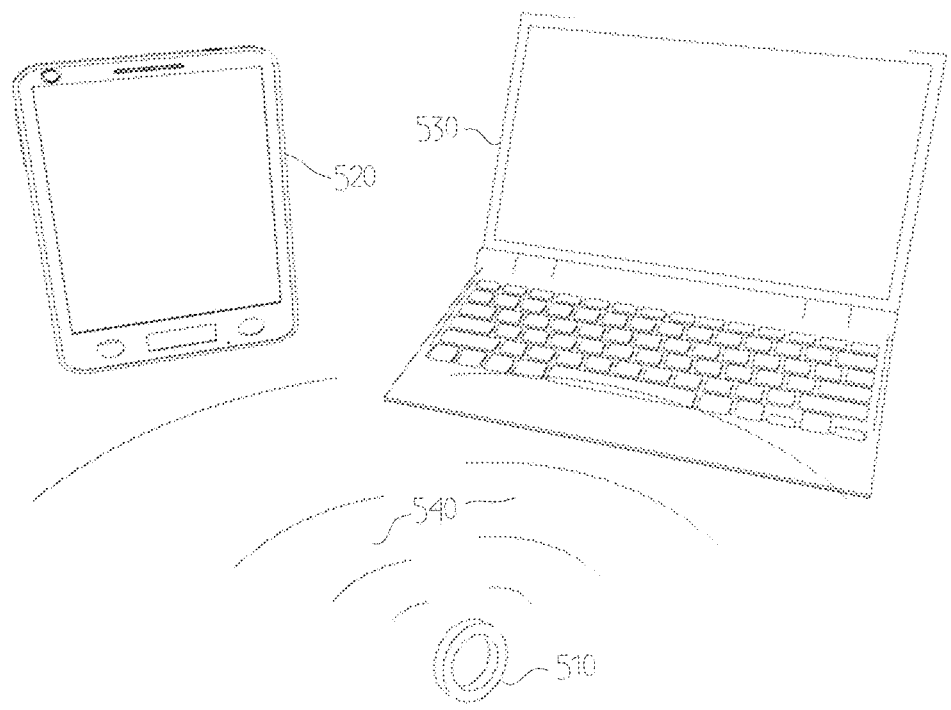
FIG. 5 is an illustrative view showing a use situation in which a ring-type input device is being used, by being held or worn by a user's hand (not shown), in wireless conjunction with multiple host computing devices, such as a television, music player, tablet computer, laptop computer, desktop computer, cellular telephone, or any such host device with information processing capabilities.

FIG. 4 and FIG. 5 show use situations where embodiments of the pen-type 410 and ring-type input device 510 are employed by the user (not shown) to authenticate with and take command of certain host electronic devices 420, 520, 530 such as, but not limited to televisions, music players, tablet computers, laptop computers, desktop computers, cellular telephones, or any form of host device with information processing capabilities. Oftentimes it is essential, or desirable to authenticate a variety of credentials with one or more of these host electronic devices 420, 520, 530, thus gaining access to the device, device administration, personal preferences, information stored on that device, and/or access to a plurality of applications, accounts, and services which may be hosted on the internet with divergent authentication systems, but are none-the-less presented via the currently-accessed host device.

In an embodiment of the present invention, when authenticated wireless communication is desired between either a pen-type or ring-type input device and a host device 420, 520 or 530 there is preferably a standards-based or proprietary wireless handshake (initial signal negotiation) that is performed. The exact nature of this handshake is specific to the reciprocal technology implemented by both a particular host device and also by the pen-type or ring-type input devices.

The input devices, input device systems and methods in accordance with the present invention may be employed with various third-party authentication software, including, for example, Google Wallet provided by Google, Inc. of Mountain View, Calif. It should be appreciated, however, that other third-party software systems for alternative applications may be used with the input devices, systems and methods in accordance with the present invention. Various third party standards-based, and consortium technologies, such LDAP, SSO, Kerberos, as well as preferably more sophisticated embodiments capable of identity management, as in ISO/IEC WD 2476, may be conveniently stored, executed by general purpose computation and wirelessly purvey credentials from input device embodiments in accordance to the present invention.

Wireless technologies that provide this wireless communication link, illustrated as 430 and 540, may include but are not limited to conventional, standards-based wireless technology architectures, such as IEEE 802.11, Bluetooth, WPA2, WiMAX, IEEE 1902.1, near field communication (NFC), various cellular wireless technologies, optical communication technologies, or similar wireless alternatives. In the illustrated embodiments, the chosen wireless communications technology could be implemented as a whole or in part within the wireless communications controller 140, the wireless communications antennae 192, 272, the pen controller 190, the ring controller 271, or with any combination of these or supplemental subsystems.

After wireless communication link 430 or 540 is initiated as per the wireless communications medium available in an embodiment of the present invention, a typical subsequent user task might be to establish one's credentials, for example within the host device's account management scheme or with any of innumerable applications, sites or internet service. The method for authentication in the embodiments of pen- and ring-type input devices is uniquely dependent on the optional availability of certain subsystems in a particular embodiment. The availability of the scroll wheel 150 or scroll wheel body 230 with or without rotary actuation and detent and the availability of a biometric sensor 141 determine authentication possibilities. Choice of authentication mechanism is also uniquely based on the user's preference, selection, or otherwise articulated sequential priority of which authentication method or subsystems to use. For example, in FIG. 4 a particular user (not shown) approaches a television 420 that may be operated by multiple users throughout the course of a day. A television may allow uncredentialed users permission to use basic functionality, but this particular user has personal audio, video, user data and recording preferences that may be unlocked with a correctly reproduced passphrase. This particular user has configured a biometric sensor 140 and biometric sensor controller 141 available in one embodiment to recognize a unique fingerprint on their hand, and has configured the particular software on the host device 420 to accept authentication from their pen-type input device 410 as sufficient for establishing their identity and virtual credentials. When the user brings the pen-type input device, for example, within wireless range of the television or other host devices 420, the user is then able to simply place their unique fingerprint over the biometric sensor 140 to establish their credentials. Alternatively, some embodiments of the pen- and ring-type input devices may remain in such an authenticated state, achieved from a fingerprint provided previously, within some configurable period of recency, in which the pen-type or ring-type input device and host device operate in a state of being used by one or more particular, authenticated individuals.

Alternatively, based on user preference, based on the embodiment's inclusion or omission of the biometric sensor 140 and associated biometric sensor controller 141, the user may authenticate embodiments of their pen-type or ring-type input device by rotating the scroll wheel 150, scroll wheel body 230, or by motioning with a finger as if moving a physical scroll wheel rotation imitated via a capacitive touch sensitive surface 320. For example, a user may authenticate via a particular unlock sequence of forward and backward rotations, demarked by physical or imitated scroll wheel cogging. As illustrated in FIG. 5 an example user (not shown) approaches host devices 520, 530 while holding one embodiment of the ring-type input device 510 that omits a fingerprint or other form of biometric sensor 141i. In this use scenario FIG. 5 the input device's example user wishes to reestablish credentials with, and then perhaps interact with the host devices using only the mechanism of a scroll wheel body or of a capacitive touch sensitive display on such a ring-type input device embodiment. Previously, this example user has configured a scroll wheel rotational unlock sequence to require, as an example, a rotational input forward through seven cogging sensations, followed by a three cogging sensation turn backward, followed by a four cogging turn forward, finally followed by a two cogging turn backward, or any plurality of rotations which may cause a plurality cogging sensations (where one cogging sensation may be triggered by a variously definable fraction of a full rotation by the scroll wheel body 230 relative to the stationary ring body 210, or in other embodiments by a finger touch around variously definable interspaced points or regions located around a physically stationary touch-responsive surface 320). Each "cogging" is preferably made evident to the user via the tactile sensation of electromechanical detent resisting physical rotation, or alternatively via an imitation detent. To continue the example, another embodiment of the pen-type input device 510 which (perhaps for economic or power consumption reasons) has no biometric sensor 140, and has only a low tech scroll wheel body 230 which is merely able to provide rotational sensor data, linear sensor data regarding pressure upward and downward, and is unable to actively rotate or resist rotation for lack of rotary actuators, and therefore is unable to produce actual detent-style cogging with its scroll wheel body. This embodiment may still inexpensively be fitted with a vibrating alert motor, as 142 in the pen-type input device, allowing it to mimic the tactile sensation of detent by activating its vibrating alert motor for very brief bursts at the appropriate moment for each "cogging" of the scroll wheel unlock sequence rotation.

Although discussed in regard to credentials/authentication, it should be appreciated that the input devices, and input device systems and methods in accordance with the present invention are well suited for use in additional and/or alternative applications, controlled. Such other applications may include, for example, selecting and moving virtual controls in two and three dimensions, drawing in two and three dimensions, and the manipulation of expressive hierarchy visualization, among other software uses. Although the utility of pen- and ring-type input devices is expected to be broad, the present invention is directed to embodiments of pen- and ring-type input devices, their utility as devices for purveying conventional third-party authentication software, and specific embodiments of a hierarchy visualization and manipulation user interface.

Hierarchy Visualization User Interface Design and Method

FIG. 4 and FIG. 5 show host devices with two-dimensional displays 420, 520, 530 that are never-the-less typically able to present three-dimensional graphics and interface elements via software and/or dedicated 3D graphics hardware, as is common with orthodox consumer-level information processing host devices. Any three-dimensional interface manipulation is uniquely aided by the specific capabilities of pen-type 410 or ring-type input device 510 embodiments, working in wireless conjunction with host devices 420, 520, and 530. The pen- and ring-type input devices in accordance with the present invention would primarily function as three-dimensional input devices. An inertial motion sensor (IMU) 193 in one embodiment of the present invention may allow a user to orient the input device with respect to the force of gravity or other fixed orientation, and also allows a user to translate and rotate that orientation in three dimensions, thus giving the input device six degrees of freedom. This free space inertial motion sensor's input, along with clicking, scroll wheel cogging feedback, authentication information and a variety of other wireless data transmissions, 430 and 540, could constitute the wireless communication between input device and example host computer devices and displays 420, 520, and 530.

Figure 6:
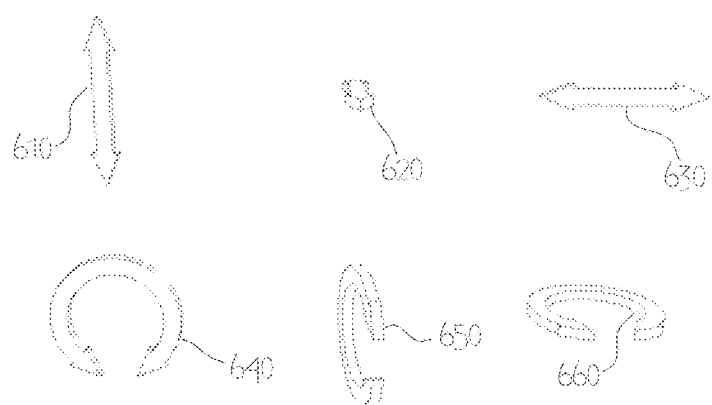
FIG. 6 is an illustrative view of six degrees of freedom afforded to users of pen-type and ring-type input devices by their inertial measurement units (IMU's)
Figure 7A:
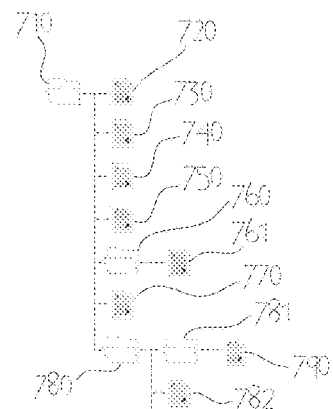
FIGS. 7A-7F are illustrative views showing software architecture, interface designs and methods wherein the pen-type and the ring-type or other input devices are used to navigate and manipulate hierarchical user data or information.
Figure 7D:
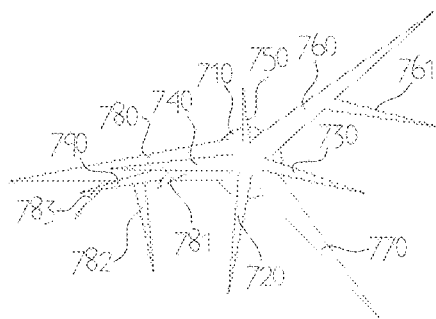
Figure 7B:
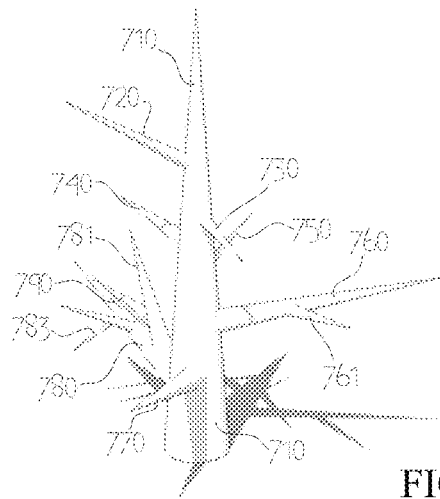
Figure 7E:
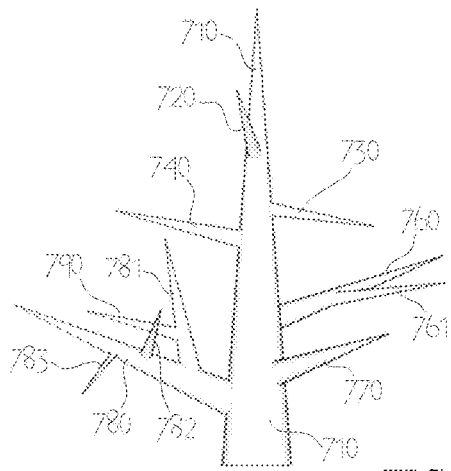
Figure 7C:
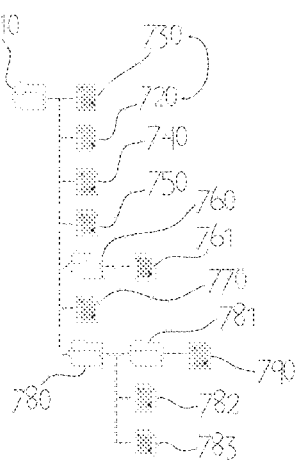
Figure 7F:
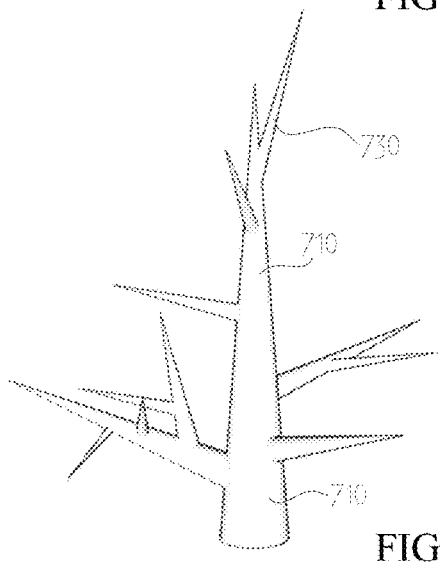

The six degrees of input movement freedom provided by an IMU 193 is illustrated symbolically in FIG. 6. Six degrees of movement freedom is a measure of positioning and inclination flexibility composed of three degrees of translation: vertical movement 610, forward/backward movement 620, and sideways movement 630; as well as three parameters signifying orientation: roll 640 around a forward axis, pitch 650 up and down around a lateral axis, and yaw 660 from side to side about a vertical axis. The present invention includes particular user interface designs and methods that make special use of these six degrees of freedom given to the user.

FIGS. 7A-7F illustrate software program state progressions which correlate logical hierarchical data structures and their graphical representations resulting from interactions whereby either the pen-type, ring-type, or other input device is used to interact with and manipulate such a visualization of hierarchical information on host devices. In one embodiment, the method for manipulating and visualizing hierarchical information takes on the visual form of a branching fractal-like structure FIG. 7B that renders many nested logical data relationships, such as text files, computer code, databases, networks topologies, a list of results from a search query, and/or a conventional filesystem of nested directories structures and diverse file types as illustrated in FIGS. 7A-7F. Countless forms of hierarchically-structured electronic information may be similarly visualized and modified with a visually revealing two- or three-dimensional hierarchical branching interface that provides expedited user understanding and manipulation of that hierarchy, in accordance with the present invention.

As an example, a hierarchy of electronic information or data, such as a small sample user-managed directory and its enclosed file structure, is depicted with the hierarchy visualization interface. Any starting point can be visualized as the root node 710 of a hierarchy or of a portion of some larger hierarchy (not shown). Nested electronic information in the form of other directories and files is illustrated in FIGS. 7A-7F. as successive nodes 720, 730, 740, 750, 760, 770, and 780 contained by root node 710. In this illustrative example, a user is manipulating a small file hierarchy composed of a base directory called "Biology Class" 710, which directly contains the files "Cell division.rtf" 720, "Mammal Report_DUE TUESDAY.rtf" 730, "Natural and Artificial Selection.rtf" 740, "Phylogenetics.pdf" 750, a directory titled "Report Ideas" 760, another file, named "Presentation #1.ppt" 770, and another directory, this one titled "Videos from the Field Trip" 780. In this illustrative example, the directory "Report Ideas" 760 contains only one file, called "Anteaters.rtf" 761, whereas the directory named "Videos from the Field Trip" 780 directly contains another directory, called "Rain Forest Canopy" 781, a file called "Tree Frog.mov" 782, and a file called "Piraña Pool.mov". Finally, the directory "Rain Forest Canopy" 781 contains but one file, "Spider Monkey.mov", and it fun to watch monkeys.

The illustrated embodiment of the present invention provides a user with a software interface design and interactivity methods with which to visualize and manipulate this hierarchy with three-dimensional means redolent of the hierarchical structures found in nature, but determined by the electronic information's metadata. Although the hierarchies illustrated as embodiments in accordance with the present invention, may be customized or "themed" to produce a visualization for that hierarchy which exhibits an ornamental design perhaps evocative of woody plants, lightning bolts, neurons, snowflakes, rivers, or any similar natural or unnatural phenomenon that expresses a branching fractal form, the preferred embodiment of this user interface design is composed of several essential organizational methods, and it is by the selection and configuration of organizational methods that hierarchies achieve a visual form with characteristics that appear inorganic, as in FIG. 8A, or a visual form with thematic visual properties, as in FIG. 8B and FIG. 11.

In the preferred embodiment of the present inventions, a plurality of hierarchical data types and/or data granularity may be visualized and manipulated as a hierarchy. Hierarchical data might include, but is not limited to directory and file topologies, also nested textual information such as the familiar document-page-paragraph-sentence-word-character hierarchy, files composed of nested textual outlines, software source code text documents' class-function-symbol-character hierarchy, and alternatively could also conceivably represent mathematical expression hierarchies, acyclic (or cyclic) graph structures, architectural floor plans, organizational charts, processes, email inboxes, discussion threads, or a network of personal or professional associations, to name only a few possibilities. Secondly, in the preferred embodiment the common relationships between members and levels of a hierarchy are conveyed via their physical orientations, positions, and sizes relative to one another. There is a rich set of possible property mappings to the organizing visible qualities of the hierarchy structure.

Specifically, each node, or member of any hierarchy, to be visualized is given a three-dimensional volume, illustrated here in FIGS. 7B-7F by conical shapes 710 through 790 or via any other similarly elongated shape. In the one embodiment, this node volume can be used to represent a quantitative property of the nodes within the hierarchy, such as but not limited to total data size, hyperlink relevance to an internet search query, media recording time duration, nearness to a temporal deadline or calendar, relative usage activity, or similar metadata. Metadata is such data about data, often the quantitative data about nodes, that may be variously retrieved or calculated in different embodiments of the present invention's software architecture. In this example, the relative sizes of node volumes is mapped to the node's visible organization-evoking property of relative node size, area or volume. It should be noted that, in one embodiment, all such associative visual mappings' scales may either be configured with literal, strict scaling heuristics or with soft, perceptual scaling heuristics that would allow greater placement flexibility and user manipulation.

In the illustrated embodiment, there is also a linear ordering of the child nodes that are in the hierarchy that is expressed along the length of a parent node's volume. This linear ordering along the parent is also useful for mapping nominal, ordinal and other metadata properties of the children, but may alternatively be mapped to any common property with which to distinguish the child nodes of any particular parent node. For instance, in this illustrative example, FIG. 7A, FIG. 7B, FIG. 7D, and FIG. 7E have the root node 710, which is a data directory named "Biology Class" 710 that has nested child nodes arranged linearly along its length based on the alphabetical order of their filenames. Linear ordering is familiar to most users of typical hierarchy interfaces, but in this embodiment of a fractal-like hierarchy, many levels of nested linear ordering and hierarchical detail may be perceivable simultaneously, limited only by user preference and the rendering capabilities of the host device.

Furthermore, the angles of child nodes with respect to their parent node's long axis orientation can simultaneously and subtly convey some other ordinal metadata property of the hierarchical nodes' underlying data elements. In other words, one embodiment may allow a user to choose yet another metadata property of the hierarchy or its members and configure a mapping of that to another angular visual cue measurable in terms of how similarly a child node is oriented in comparison to its parent node, when rotated around some axis perpendicular to the long axis of the parent node. For example, in this illustrative arrangement FIG. 7B, FIG. 7E, and FIG. 7F each child node of the directory "Biology Class" 710 is angled away from that parent's long axis with a relational mapping heuristic that might convey visually, with a loose perceptual scaling, relatively how recently the particular child node has been modified compared to sibling child nodes.

Three-dimensionality, although not an essential aspect of the present invention, is eminently useful as a visualization aid, especially so when a user is able to manipulate that visualization with a pen- or ring-type input device that supports gesturing with six degrees of freedom. If a particular embodiment of the present invention's visualization displays with three-dimensional geometry, then another visual cue is afforded to the user. Namely, the radial angle of the child nodes, with regard to their rotation around a parent, can also be mapped to an associated meaning. For instance, in one embodiment visualizing a hierarchy for file browser manipulation, as depicted in the illustrative example of FIGS. 7A-7F, a user chose to depict relative file size as relative node volume. The example user also chose to linearly arrange files alphabetically along the parent axis. The angle of a child node as measured away from the parent axis was designated by an example user to correlate the relative modification dates among sibling files and directories. A savvy user manipulating the hierarchy in three dimensions now still has the radial arrangement of nodes around the long axis of the parent directory at his or her disposal, for conveying yet another layer of nuanced discernment. A savvy user might perhaps employ radial arrangement to cluster like files in similar directions radially by mapping the radial sorting parameter to file type, file extension, or to a file creator encoding. In the illustrative example FIGS. 7A-7F, a user has expressed no preference as to which of many possible file or hierarchy relationships should be mapped to radial orientation around the parent axis. Therefore, the illustrated embodiments might autonomously simply balance the radial spread of the sibling child nodes, that they might be more equally dispersed around the parent node and therefore be more easily visible.

It should also be noted of the illustrated embodiments that the children of example subdirectory "Videos from the Field Trip" 780 has its child nodes linearly ordered, not alphabetically by name, but rather as linear order along parent long axis, as sorted by audio/video track duration. In actual use, one may notice how closely audio/video track duration correlates to audio/video nodes' file size, by switching which collections of metadata are mapped to the volumetric organizational method. This nonuniform sorting of the example hierarchy FIGS. 7A-7F illustrates another important aspect of the preferred embodiment of the present invention, to with these relational mappings of various hierarchy properties and the properties of the hierarchy members may be mixed diversely from node to node in order to form an amalgamation of schematics, heterogeneity of rationale, and multiple organizational principles in a single visualization. Organizational Methods, or sorting techniques, allow the user and embodiments of the software architecture to arrange a particular hierarchy in multiple ways within the same visualization, that the user might tease out different relationships and organizing principles visually, and simultaneously via multiple configured visual cues For example, in the illustrative embodiments of FIGS. 7A-7F, an attending user (not shown) might have chosen to modify the file that was previously named "Mammal Report_DUE TUESDAY.rtf" 730 in FIG. 7A, FIG. 7B, FIG. 7D and FIG. 7E, so that the file is now named "Aardvark Report.rtf" 730, and so that this file is now modified to be much longer and more complete than the original, example file given to the user by the course's instructor. The updated illustrative visualization of this small example file hierarchy, as might be produced by one embodiment of the software architecture, would now appear as in FIG. 7F with changes shown in keeping with the aforementioned organizational structure. Specifically, the illustrative volumetric three-dimensional conical branch shape 730 representing the changing file becomes larger, visually indicating the increase in the file's size as said example user commences increasing the length of the textual data. The illustrated change of the linear position of the branch 730 along the parent node 710 now causes it to precede all other sibling nodes, because one ordinal sorting metric of the filename "Aardvark Report.rtf" precedes other sibling node filenames alphabetically. Furthermore, the angle of the node 730 relative to the parent node's 710 orientation may change to also be more acute, perhaps mapped to indicate that the file has been recently modified. All of these new visual cues make complex relationships among file and other node metadata accessible to a user of the present invention's software embodiment at a glance in FIG. 7F. Comparatively, a conventional iconographic representation of this change is offered in FIG. 7C, indicating how few of the changed hierarchy properties are readily discernible in the more traditional, two-dimensional hierarchical representation. Thus, file and directory visualization in accordance with the present invention offers perceivable mapping of hierarchy metadata to Organizational Method branching graphical structures rich with visual cues represents a significant improvement over prior art in the field of user interface design for hierarchical data.

Figure 8A:
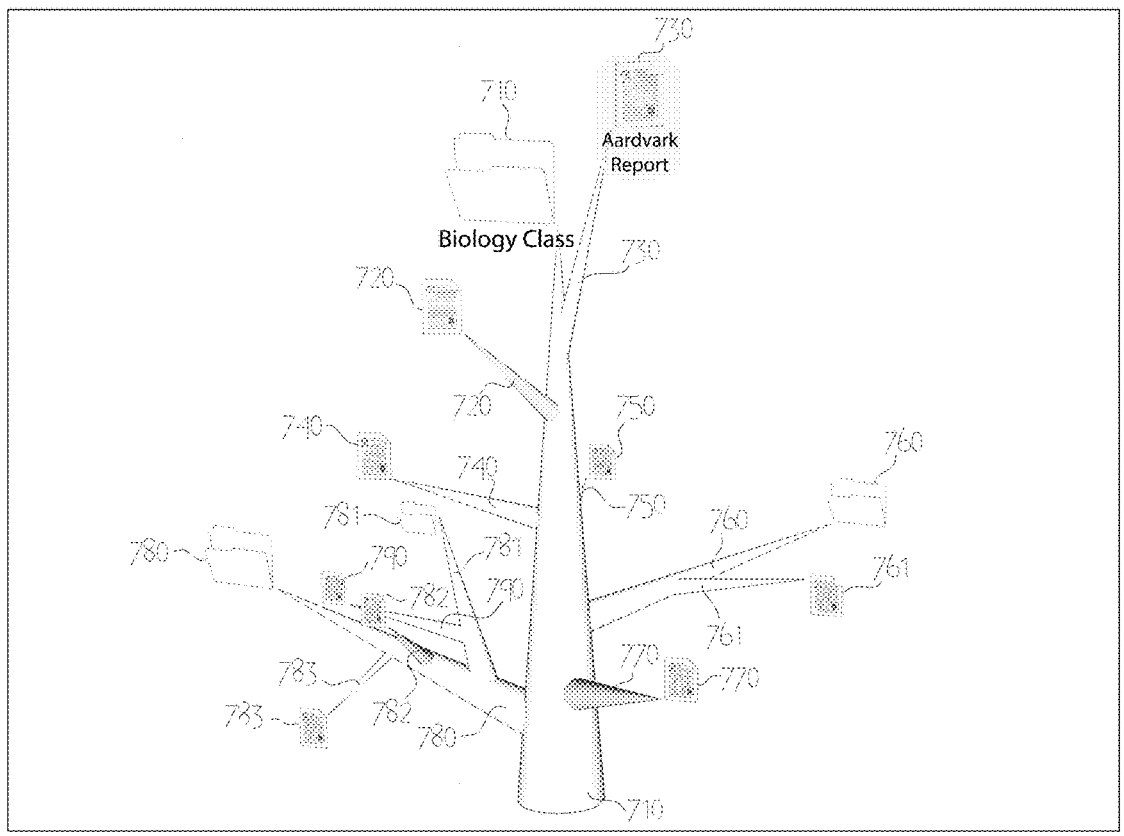
FIGS. 8A and 8B are illustrative views showing how directory, file and text hierarchies would be displayed in accordance with certain embodiments of the present invention.

FIG. 8A illustrates how file iconography and filenames might appear on a host device's 420, 520, 530 display, when added to the file visualization examples of FIGS. 7A-7F. In one embodiment of the present invention, using both hierarchical branching structures and also file iconography and filenames would allow users more familiar with file and directory iconography to view the icons, increase the effective selectable target for each file and directory, as with selected node 730 in FIG. 8A, and would also serve to further differentiate the nodes within a hierarchy.

Moreover, the application of the pen- or ring-type input device's unique pointing and manipulation abilities in three dimensions can be appreciated by considering the desire of a user to customize the exact position, angle of orientation, or rotation of individual nodes. In the illustrated embodiment, the manipulation and restructuring of the hierarchy would be accomplished by selecting a node in the three-dimensional virtual space of the software visualization and moving that node with analogous physical movement of a user's hand (not shown) which is grasping, wearing, or otherwise holding the pen- or ring-type input devices 410 and 510, respectively. In one embodiment, user-controlled movement of a node to topologically different areas of a hierarchy would be accomplished by selecting, or "grabbing" the node in question (variously, with configurable use of buttons, pressure sensors, or capacitive touch sensor areas provided for in some embodiments, but generally via an action akin to familiar input events such as "clicking," "clinking and holding," or similar input gestures) and by simultaneously moving or "dragging" the input device in physical space of the user's periphery. The preferred embodiments of the pen- and ring-type input device thus offer the ability to position objects rapidly and accurately with six degrees of freedom, and provide a scroll wheel or similar gestural capability for navigating up and down a deep hierarchy very quickly. As such, the hardware input device embodiments of the present invention are well adapted for use with the disclosed software user interface design and methods of the present invention, and, conversely, the disclosed user interface of FIGS. 7A-7F and FIGS. 8A and 8B provides the input devices with significant raisons d'être beyond simple utility as a purveyor of host device authentication uses.

Figure 8B:
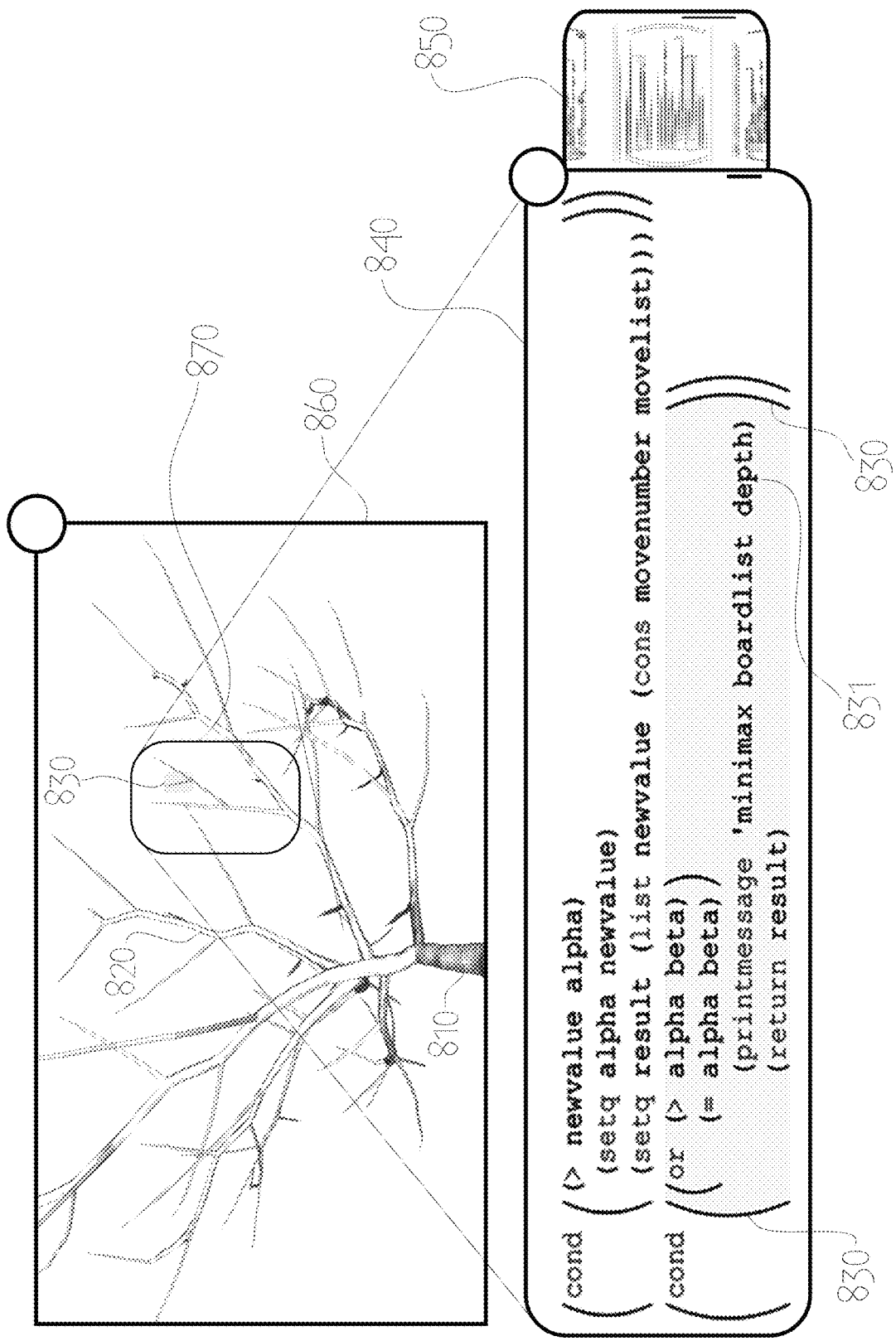

FIG. 8B suggests in illustration the breadth of information visualizing capabilities that the an embodiment of the present invention might provide. As mentioned above, the disclosed user interface design and method embodiments are more-or-less equally well suited to many forms of hierarchical data, many forms of ordinal and relational metadata, and many choices of visual cues for mapping the elongated nodes to that metadata. FIG. 8B serves to expound on several of these techniques as may be used in some embodiments.

In an exemplary use situation where the pen-type or ring-type input devices are employed by an expert user to manipulate a sophisticated hierarchy FIG. 8B, several more Organizational Method visualization techniques would preferably be enabled in the user interface of the present invention's software embodiment. FIG. 8B illustrates the visualization of a source code management (SCM) or version control system (VCS) hierarchy 810 with the disclosed user interface design and methods. A supporting version control system (VCS) may consist of any or a plurality of commodity software-managed hierarchy topology and data change record-keeping software, with which precise notification and control over an individual user's file and directory modifications may be more automatically conducted in a multi-user environment. The underlying technology that generates or "serves up" the hierarchical metadata could include, but is not limited to common SCM solutions such as Concurrent Versions System (CVS), Apache Subversion (SVN), Bazaar, Git, or any of a number of commercial or non-commercial file and directory version control or asset management software applications. Particular choices for a hierarchical version control system software substrate are embodiments in accordance with the present invention's software architecture.

In FIG. 8B, an illustrative hierarchy visualization with root node 810 is a collection of example text, example computer program source code, or other files managed by a versioning or asset management subsystem. The particular source code illustrated is provided purely as example. Another form of Organizational Method is perceivable in FIG. 8B beyond the visual cues mentioned above. The hierarchy node volumes originating from root node 810 may exhibit a curvilinear meander instead of appearing as rigid conical volumes, as in FIG. 8A. In this illustrative example of the one embodiment, the user or users of the version control system may have indicated a preference for the hierarchy 810 to represent metadata regarding the frequency of data modification, as tracked by the version control system, by mapping such frequency to an Organizational Method varying the amount and position of curvature along the long axis of a particular node, 820 for example. In this way, the entire history of a particular node's changes might be summarily visualized and understood with a glance, without the need for the extensive textual logs, records, notes and timestamps typically requested of a VCS to discern such metadata. Quite strikingly and in this way, the present invention presents significant advantages over the state of the art in hierarchical data versioning visualization, user interface design and methods.

FIG. 8B also illustrates the naturally hierarchical and nested quality of example textual data, especially prevalent in human-readable textual information. As stated, the preferred embodiment of the disclosed user interface design and methods is well suited to represent sub-file hierarchies, or parent-child relationships within individual files, and can aptly do so within the directory-and-file, database, or other hierarchy visualization that contains them. In this illustrative example FIG. 8B, a particular section of example software program source code is selected 830, or is "opened," and is therefore displayed in an illustrative two-dimensional user interface window 840 representative of current user interface design on any of a variety of host devices. In this way, one embodiment causes the illustrative host device display 860 which render the selected, nested text 830 alongside its nearby logical structure 820, and simultaneously with an illustrative typical two-dimensional example of text in a two-dimensional interface window 840. In one embodiment, text visible in illustrative window 840 may correspond to an "area of interest" 870 within the visualization. In the illustrated example situation, changes that have occurred to this particular selection of source code 830, and changes that follow, in an example multi-user environment of source code management 810 may be immediately perceived both visually and textually, based on which symbolic Organizational Methods are mapped either directly or indirectly to the metadata being visualized. In accordance with one embodiment of the present invention, the three-dimensional display of Source Code Management changes presents significant advantages over the state of the art in multi-user SCM interface design and methods.

It is worth noting here that the hierarchy visualization of the preferred embodiment may be used to represent a granularity up to the level of individual linguistic symbols, such as the word "depth" 831, or even beyond the symbol level by representing each individual character ("d" "e" "p" "t", and "h") as independent child nodes of the symbol "depth" as their parent. No limits to the granularity of digital information that might constitute a hierarchy member or node should be inferred by this disclosure. Continuing this line of thought, an embodiment of the present invention may further reveal even the characteristics of each letter as child nodes of that letter in the hierarchy visualization, or sub-branches of that letter. For example, a small data granularity could be achieved by conveying the Unicode representation of "d" as sub-branch of "d" entitled "U+0064," and/or by conveying the font of the character, "Times New Roman," and the font size, "12 point," as sub-branches of the letter which may be revealed upon closer examination.

Figure 9A:
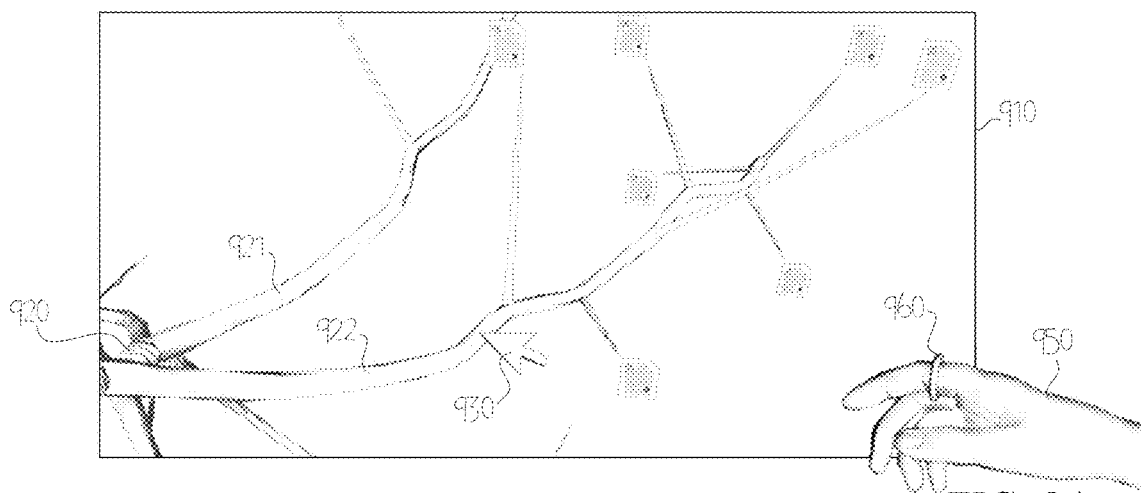
FIGS. 9A-9E are illustrative views showing use situation details in which the disclosed ring-type input device is being held or worn in a user's hand, in wireless conjunction with a host computing device displays, with the views depicting embodiments of that use, namely the direct manipulation of file, text, and other data hierarchies in accordance with aspects of the present invention's software architecture, interface design and methods.
Figure 9B:
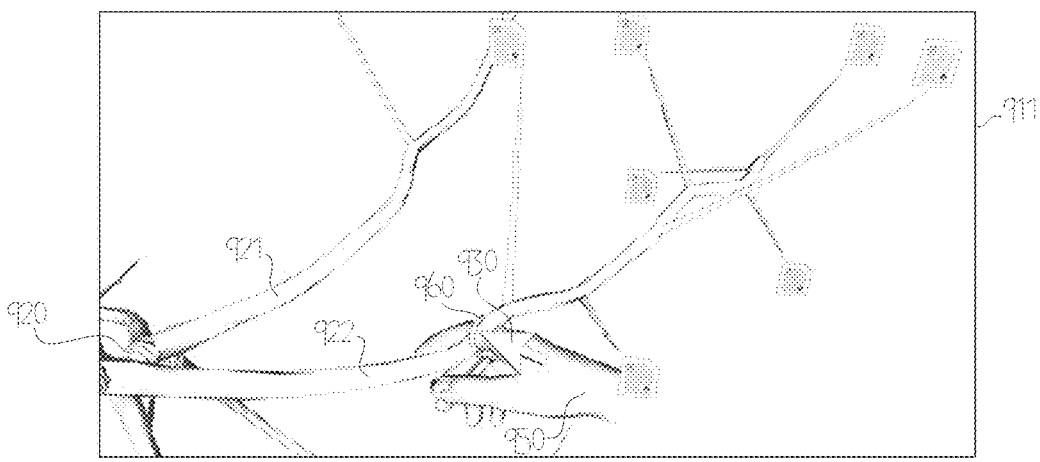
Figure 9C:
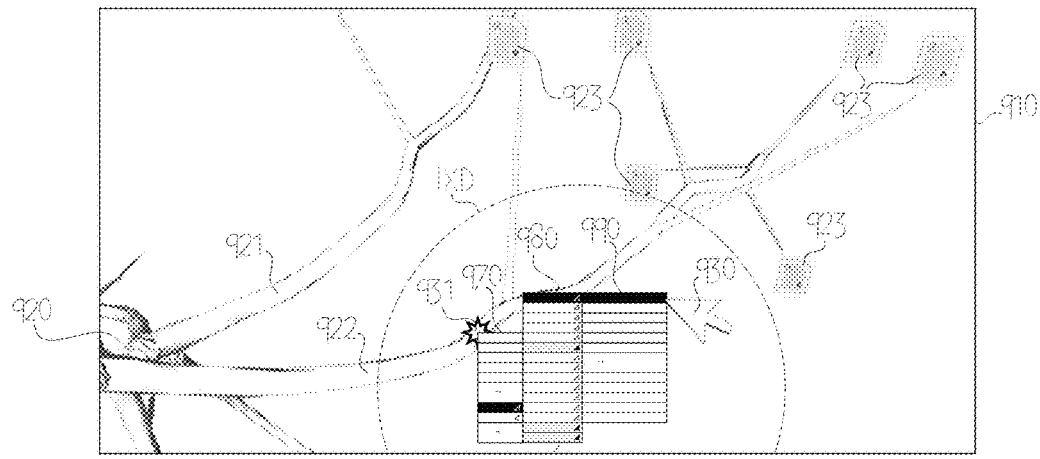

FIGS. 9A-9C illustrate the use of pen- and ring-type input device used in conjunction with host devices and their displays, given the six degrees of freedom, selection and orientation information sent via wireless communication between the input devices and the host device displays.

FIG. 9A demonstrates use scenarios of one embodiment of the present invention wherein the display of a host device 910 is capable of graphics which appear to a human user two-dimensionally on the surface of that display, although the hierarchy itself 920 may be represented with three-dimensions, as in the preferred embodiment, or not. In such usage, the user's hand 950 is, and appears to be distant from the present invention's rendering of a hierarchy. A ring-type input device 960, or a pen-type input device held or worn by the user would appear distant from the arrow, cursor, selection, or other representation of the input device's focus of action 930 onscreen. The user's focus, and area of activity 930 is nearer the child hierarchy 922 than it is to child hierarchy 921, and therefore one embodiment may render more visual detail along child hierarchy 922. The preferred embodiment retains enhanced visual detail in areas of the hierarchy based on user focus 930, a plurality of foci, current selections, past foci, and also contingent on performance considerations of the host device, and user preference, among other "Level-of-Detail" heuristics.

FIG. 9B, however, illustratively shows use scenarios wherein the display of a host device 911 is capable of graphics which appear to the normal vision of a human user three-dimensionally, either on the surface of that display or seemingly in mid air, and whether the hierarchy itself 920 is optionally represented with three-dimensions, as in the preferred embodiment, or not. With such a display, the user's hand 950 and input device 960 appear to be occupying the same visual proprioceptive space as the focus 930 and subject of the area of activity 922. In conjunction with a display of three-dimensional graphics capabilities, the user's hand and input device appear to be manipulating the hierarchy more-or-less directly, as they appear to be colocated from the user's perspective.

The specific capabilities of one host device or another, regarding the three-dimensional capabilities of their displays and performance characteristics, do not affect the fundamental aspects of the present invention, with exceptions such as Level-of-Detail degradation considerations. Therefore, the user's physical hand 950 and input device 960 are omitted in subsequent figures for the clarity of the illustrations and the disclosed methods. The location and movement of the hand and input device may be taken to be analogous to the moving focus 930.

FIG. 9C illustrates a user selecting and issuing one among an example set of hierarchy manipulation and organizational methods. With the user's focus 930 selecting child hierarchy 922 at an action focus location 931, an interface element 970 is presented to the user to offer options pertaining to the subject of the action focus. In this example, the hierarchy is a common nested file and directory filesystem 920, so the interface element 970 might take the form of a common textual menu provided by a host device's Operating System.

Figure 9D:
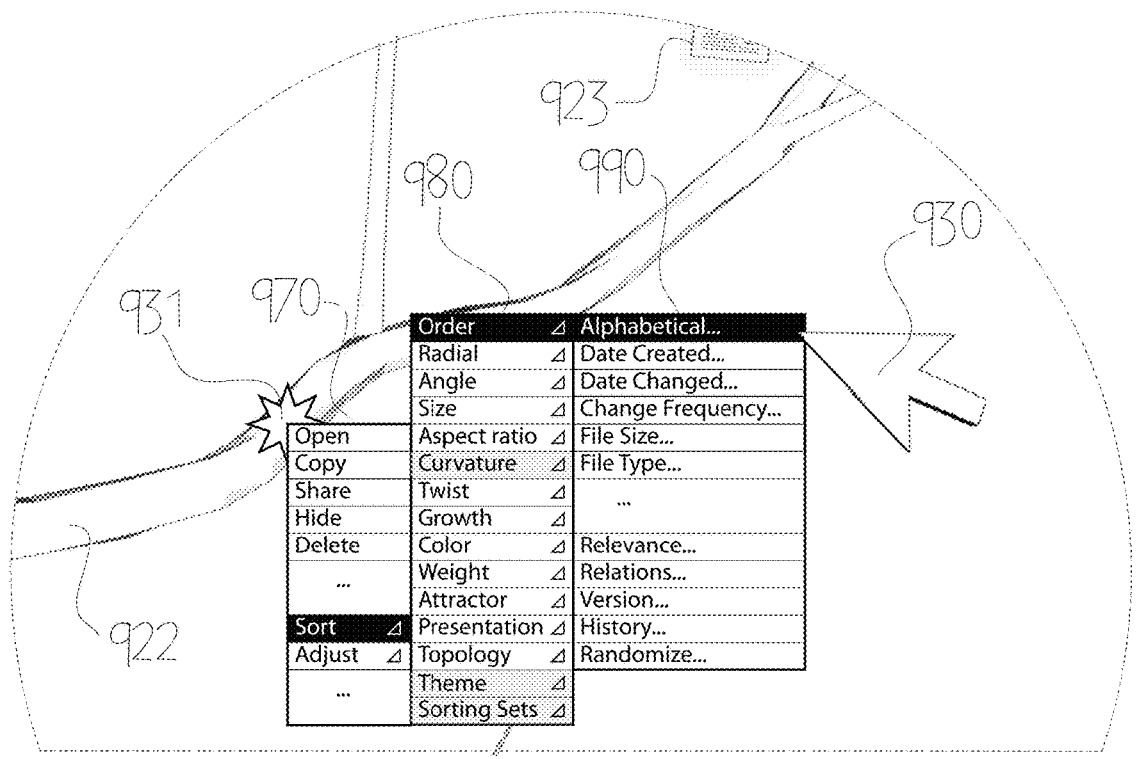
Figure 9E:
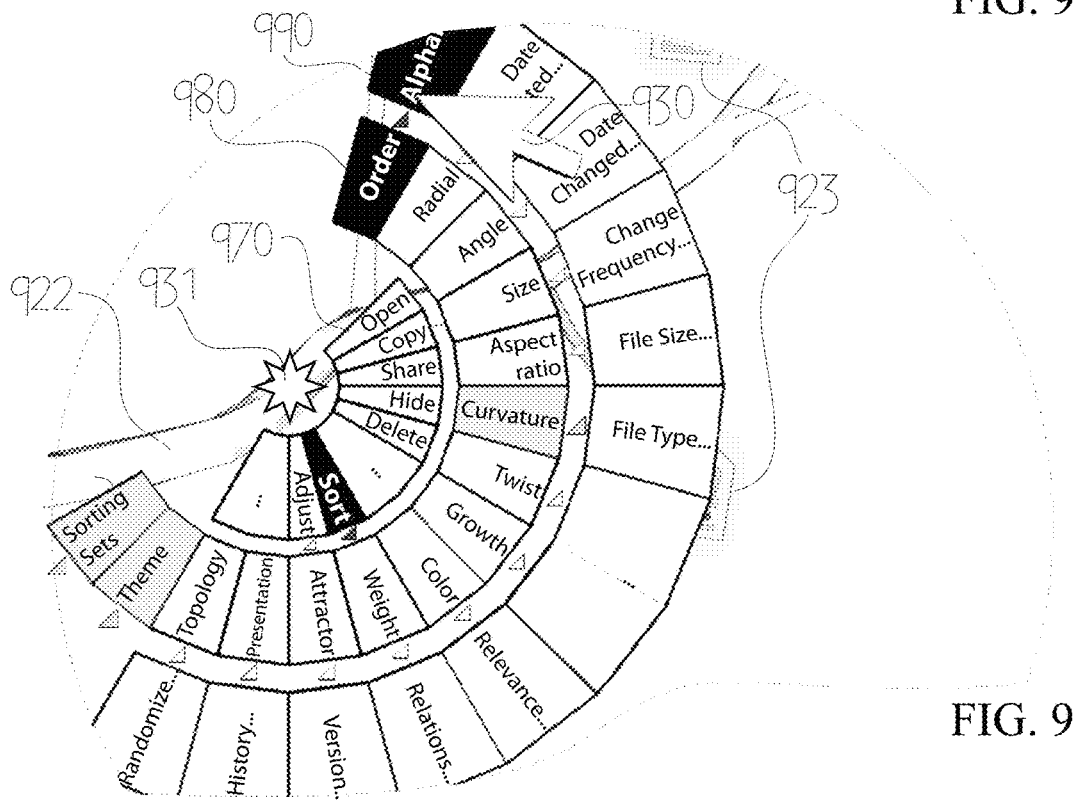

A detail view showing illustrative examples of these interfaces elements is provided in FIG. 9D. An alternate illustration showing another possible form of interface elements 970, 980, and 990 is shown in FIG. 9E, although they are functionally equivalent and contain the same members. In these examples, element 990 is a sub menu style interface element 980 member {"Order"}, and interface element 980 is itself in turn a sub menu style of interface element belonging to member{"Sort"} in element 970. In one embodiment of the present invention, the content of these interface elements 970, 980, and 990 is variable, allowing for curated sets of members, perhaps to limit advanced options for novice users. provide member names in different languages, as graphical representations of these member names, or to provide more detailed control of these options. Additionally, the interface elements 970, 980, and 990 may appear with any ornamental style, as in the illustrative view FIG. 9E of one embodiment. The particular visual form of interface elements 970, 980, and 990 are not vital to the present invention, as they may take the form of any variety of common interface elements, such as industry standard contextual menus as in FIG. 9D, alternately as radial menus shown in FIG. 9E, as graphical objects or iconography, as common two-dimensional windowing interfaces providing many of these and related options, etc. However, the functionality and the methods invoked by and represented by example interface elements 970, 980, and 990 and their members exhibit the essential organizational capabilities of the preferred embodiment. It is intended that, in embodiments of the present invention, both users and/or providers of a hierarchy's data could customize and modify the appearance, means of invocation, and arrangement of interface elements 970, 980, and 990 dynamically and whimsically. It is also intended that a user and/or the present invention's software architecture and methods may curate membership of the interface elements 970, 980, and 990 to achieve appropriate utility for particular use scenarios, to better match a user's experience level, or to better reflect options relevant hierarchy contents.

Hierarchy items 923 that are affected by actions at focus location 931 are made evident to the user via visual cues. In one embodiment this visual cue might appear as a visible selection or highlight of affected hierarchy items 923. In this illustrative example of one embodiment, the hierarchy 920 is a commonly encountered nested file and directory filesystem, therefore the interface element 970 might contain options {"Open", "Copy", "Share . . . ", "Hide", "Delete", . . . } that may be appropriate actions to invoke on filesystem items. The exact text and representation of these options is not vital, simply that some interface 970 be provided which achieves the functionality disclosed to invoke hierarchy manipulation and organizational methods contained within this disclosure. For example, the top-level interface element 970 may contain text localized to the regional language of the user, could be presented in any number of orientations and orders, or might be represented by symbolic button iconography. Interface elements 970, 980, and 990 need not be visible at all in to constitute an embodiment of the present invention. For example, each organizational method represented in element 980 could instead be invoked by a unique gestural movement of the hand and input device. Of import is that one or several of the organizational methods, represented in this example embodiment by sub menu 980 and its textual menu items, be accessible for hierarchy metadata visualization and morphological manipulation. In the preferred embodiment, the number and detail of the organizational methods 980 presented to the user varies depending on user preference and user type. For example, a novice user of the interface may be better served with fewer organizational options; whereas a user of sufficient savviness may be better served with access to all organizational methods. Furthermore, an expert user may not need a visual representation at all, as each of the following organizational methods could be invoked via custom gestural movements of the hand 950 and input device 960.

In one embodiment, organizational methods available to users in the {"Sort"} submenu's illustrative set of methods 980 include {"Order", "Radial", "Angle", "Size", "Aspect ratio", "Curvature", "Twist", "Growth", "Color", "Weight", "Attractor", "Presentation", "Topology", "Theme", "Sorting Sets"} but should be expected to also include any number of other organizational methods that are user-defined. For clarity, the intended functionality of each organizational method is elaborated here, with a more detailed description of their means provided in the discussion of the software architecture illustrated by FIG. 12A and FIG. 12B.

{"Order"}, in one embodiment of the present invention, invokes an organization of affected items 923 relative to their linear order along the axis of the parent item 922. As illustrated in this example hierarchy of directories and files, the present invention avails the user with metadata metrics 990 suitable for this context of a filesystem, and suitable for order ranking and arrangement along the linear axis of the parent 922. In this example, the embodiment depicted offers the user metadata metrics including {"Date Created . . . ", "Date Changed . . . ", "Change Frequency . . . ", "File Size . . . ", "File Type"} then perhaps some metrics specific to the affected files 923 types. For example, given the presence of audio files, bit rate may be a useful metric, where word count would be a meaningful metric for textual files. The available metrics might also include "Relevance . . . ", if the given hierarchy 920 is generated by a search query, or [Application/file type] "Association . . . " if a mix of file types is affected. The metadata metrics might also include members "Version . . . " or "History . . . " and related concepts like "Revision . . . ", "Author . . . ", and "Last Commit . . . " (not shown), if, as in one embodiment, the attendant files 923 of the example hierarchy 922 being displayed by this illustration were managed by version control software. Finally, artificial placement metrics such as "Randomize . . . ", as well as "Staggered . . . ", "Even . . . ", and other conceivable stochastic and regular placement methods (not shown), could be used to give the affected items 923 a linear order along their parent axis, or an arrangement via any other organization method member of interface 980, that is artificially generated to not express any metadata information visualization of the affected items.

By extension, one embodiment of the present invention offers all of the metadata metrics in 990 for mapping to each and every organizational method in 980 for sorting and adjusting the visual cues expressed via the hierarchy's form. For example, the organizational method "Radial", a member of the organizational method set 980 could reveal a comparable collection of metrics 990 with which to arrange the affected items 923 radially, in rotation around the parent's axis 922. The organizational method "Angle" would likewise have access to similar metrics 990, with which to angle each affected items' axis with regard to the orientation the parent axis. Method "Size" would scale the relative volumes of affected items in a corresponding way, with a similar set of metrics 990. Method "Aspect ratio" would map comparative or artificial metrics to affect the items' height and width ratios.

In one embodiment, the organizational methods "Curvature", "Twist", and "Growth" could be used to vividly express certain metadata to a discerning user like never before. For example, the "Change Frequency . . . " metadata metric of versioned files could thus be visualized by rendering affected hierarchy with twists or bends, increased or slowed elongation of axes, as filesystem change occurs.

Organization method "Weight" is analogous to a positive or negative gravitropism in organic structures, while method "Attractor" could be considered analogous to photomorphogenesis in plants. Several "Attractor" methods could be invoked to push and pull affected items based on any available metric.

In one embodiment, an organizational method, represented in this example by a menu item with the text "Presentation", provides a visual arrangement relative to the user's perspective. File iconography that is aligned, or "bilboarded," toward the user's perspective would be an example of a "Presentation" organizational method's settings. Other useful "Presentation" organizational choices may include the influencing the layout of affected items 923 in grids, lines, or space-filling clustering and separation of the items, from the user's perspective.

The method "Topology" indicates an organizational capability of one embodiment to dynamically reorganize the nested parent-child relationships within hierarchies by applying the available metrics applicable to the selected, affected items. As an example, method "Topology" might be mapped by the user to the metric "File Type", and the present invention temporarily renders the affected items in artificial parent-child or directory-file relationships, satisfying the user's desire to group like file types together in an automatically generated topology, an artificially organized and deeper hierarchy of directories.

Organizational method "Sorting Sets", in one embodiment, represents functionality in the present invention allowing the user to group, save, recall and apply combinations of other organizational methods. For example, the example hierarchy 922 selected at action focus location 931 has organizational methods "Order", "Curvature", and "Theme" applied as a sorting set of methods. Combinations of organizational methods are referred to as "Sorting Sets" in this embodiment.

Organizational method "Color" is quite simple, self-explanatory and quite common in prior art, whereas method "Theme", in one embodiment, might alter the appearance of an affected hierarchy completely, by providing entire "Sorting Sets" of organizational method presets, distinct branching metaphors, sweeping changes to topology, and broad variation of stylistic visual appearance of affected items. For example, one "Theme" might called "Deciduous Tree", arranging hierarchy in a manner evoking botanical forms, while another "Theme" might be called "Lightning", employing a vastly different "Sorting Sets", organizational method settings, colors, and topologies to achieve a hierarchical appearance of atmospheric lightning.

Figure 10A:
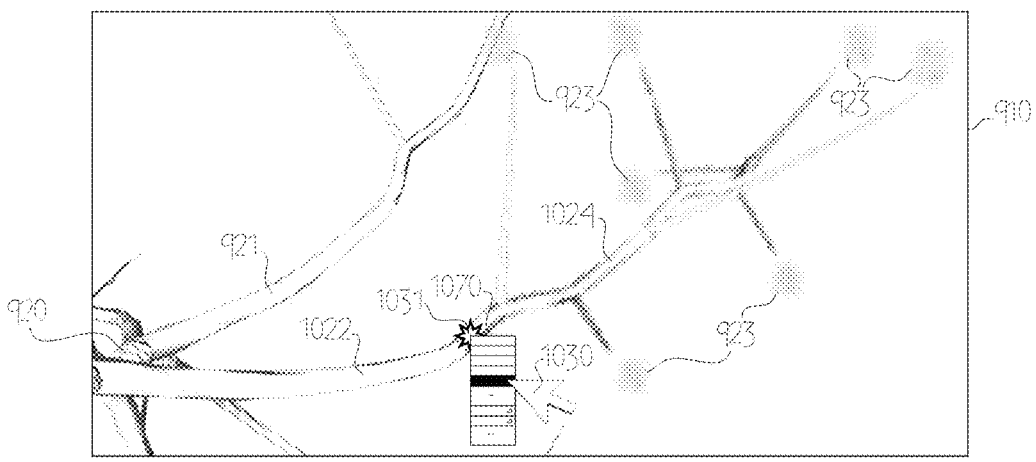
FIGS. 10A-10C are illustrative views showing use situation details in which the hierarchy interface in accordance with the present invention offers visual methods for the rendering of example hierarchical data over the course of its lifetime, and over the course of its presence temporally.
Figure 10B:
Figure 10C:
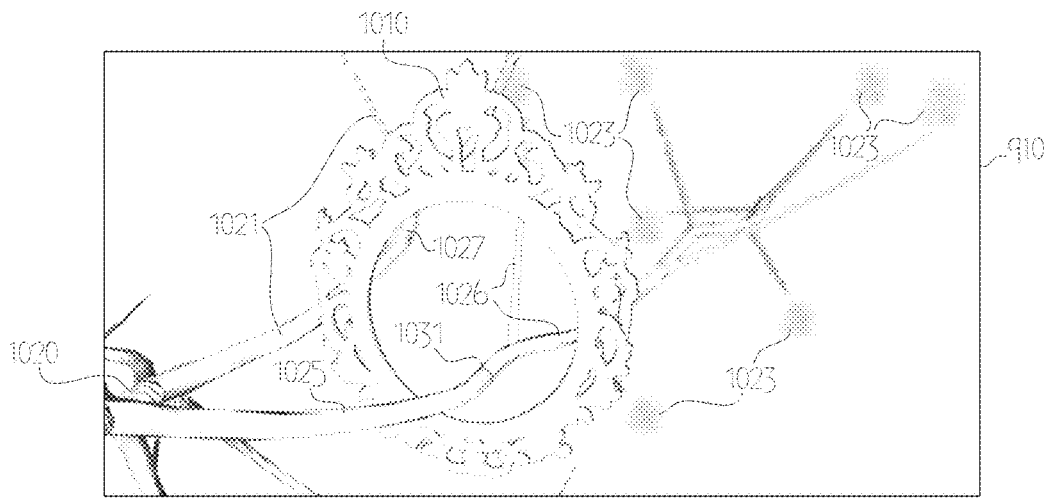

FIGS. 10A-10C illustrate rendering methods in which members of the hierarchy no longer exist at their previous location, for whatever reason, are rendered differently due to data location, or have been moved, topologically, over time.

FIG. 10A illustrates an example interface of the present invention in which portions of a hierarchy 1024 have been deleted or have been moved to other locations within the hierarchy 920. In such cases, visual indicators representing the no longer locally extant hierarchy items 923 are not rendered normally. As an example, a user may select a portion of the hierarchy 1022 at action focus location 1031, and then choose the action "Delete" form whatever visual form interface element 1070 presents: in this embodiment, interface element 1070 presents the visual form of a common textual menu. After the example removal action at this location is acknowledged by the user, the affected hierarchy 1024 and affected items 923 animate their visual appearance to indicate the removal change. In the preferred embodiment, animated changes to the visual appearance of the removed hierarchy 1024 and affected items 923 could include, but are not limited to fading the removed hierarchy transparently, displaying a proxy object like a barren branch 1024, animating moving the hierarchy, displaying a link to or textual log of the deleted or moved portion of the hierarchy, or simply by immediately ceasing to display the removed portion at this location of the hierarchy.

FIG. 10B illustrates a possible visual result of the removal action illustrated in FIG. 10A. In this embodiment, a portion 1024 indicating the previous location of the removed hierarchy 1024 and affected items 923 is all that visibly remains, alongside parallel areas 921 of the parent hierarchy 920. In other embodiments of the present invention, user preference might prefer that no remnant portion 1024 appear at all after removal, or that botanic "bud scars", the rough curvature areas at parent 920, be the only visual indicator that the hierarchy bifurcated in this area at some time in the past.

FIG. 10C illustrates an embodiment as it displays a hierarchy 1020 in which a member of that hierarchy 1025 is or fundamentally acts as a placeholder location, such as a "symbolic link" among locally nested file-and-directory hierarchical relationships, remote server storage, a cloud computing service, a hypertext link within a textual hierarchy, an internet web page location, or other data location shift. In the preferred embodiment of the present invention's software architecture, user interface design and methods, links that bridge literally located hierarchical structures would be represented by hierarchy items 1025 that pass through planar portal interface metaphor 1010. In this example embodiment, the planar portal interface metaphor 1010 associated with link 1025 separates the local data hierarchy 1020 from remotely located items 1023 with the visual metaphor of a mirror-shaped planar portal interface metaphor geometry 1010. However, in the preferred embodiment, a variety of planar portal interface metaphor geometries would be equally suitable, including but not limited to three dimensional representations of mirrors, as in the embodiment illustrated with 1010, or similarly, as windows, doors, liquid pools, magical gateways, curtains, regions of fog, mists, passageways, lenses, prisms, and any from among a number of other metaphoric ocular or entry motif intersecting an item in the hierarchy.

The defining aspect which distinguishes planar portal interface metaphors 1010, in the present invention, is the disclosed ability to conceal and reveal regions of hierarchy which do not reside locally in the logical structure of the surrounding hierarchy. For example, in the embodiment illustrated in FIG. 10B, the planar portal interface metaphor 1010 represented by a mirror intersects hierarchy element 1025 at location 1031. The continuation of this hierarchy element 1026 is visible only via the plane of the ocular or entry motif presented by the planar portal interface metaphor 1010. Areas of the non-local hierarchy 1023 which do not appear through the planar portal are rendered invisible, transparent, or similarly obscured to the user's perspective. Likewise, parallel elements of the hierarchy 1021 which pass behind the planar portal 1010, as hierarchy section 1027 does, are similarly invisible, transparent, or obscured to the user's perspective. Effectively, the planar portal interface metaphor in the preferred embodiment renders a perspectival visual hyperlink between two non-contiguous hierarchies and/or between spatial regions within the same hierarchy.

Figure 11:
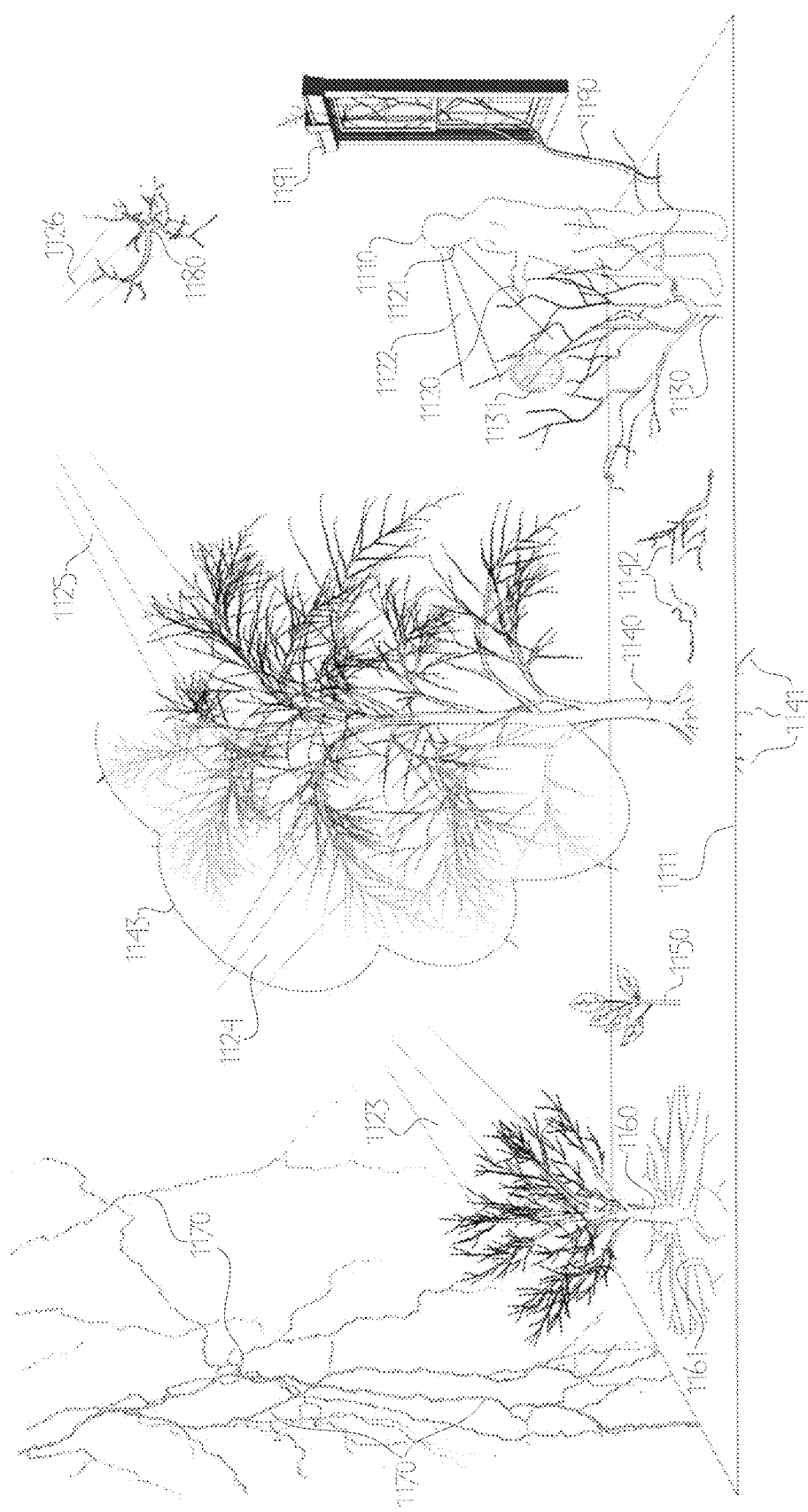
FIG. 11 is a lavish view of the present invention, illustrating an embodiment in heavy use.

FIG. 11 is a view of the present invention which generously illustrates many features of the preferred embodiment as disclosed above. This figure represents a use scenario that fully transforms the relationship between a user, computational devices, and the interface designs and methods that allow the user to organize, perceive and understand complex structures of digital information like never before.

The use scenario illustrated in FIG. 11 depicts a user 1110 grasping the present invention's pen-type input device 1120 and perceiving an immersive, three-dimensional virtual interface which appears to envelop him or her. Although any form of host device display is capable of reproducing the software architecture, user interface design and methods described above, the preferred embodiment is at its most useful when used in wireless conjunction with immersive display technology. Immersive three-dimensional displays of various qualities have existed for decades. However, they have only recently become readily available to consumers with forms and functionality appropriate for regular use. Immersive displays have extraordinary potential, but there has yet to be a suitable user interface design and software architecture that allows immersive displays to be used successfully for general purpose computing tasks. The present invention addresses these deficiencies, supersedes, and enhances the general purpose computing tasks beyond the possibilities heretofore available with the prior art.

In this illustrative example, the user 1110 perceives three-dimensional representations of the preferred embodiment's hierarchical interface design and methods as surrounding the user's physical body via stereoscopic eyewear 1121. The user is thus able to perceive the immediate hierarchy 1130 as enveloping him or herself. The user is able to walk around and move one's head to look around and alter perspective. The user is able to perceive the three-dimensionality of the disclosed software and interface designs as co-existing with the user's own physical three-dimensionality. The user is also able to connect the physical space of the preferred embodiment's ring- or pen-type input device 1120 directly to the virtual space of the disclosed interface designs.

The user 1110 equipped with an immersive display 1121 is able to perceive nuances in data relationships, by perceiving organizational methods of "Curvature", "Angle", "Radial", and other sorting methods and sets, as described in FIG. 9C, instantly, without rotating and moving a hierarchy 1130. The user is able to peer through the planar portal interface metaphor 1131, represented in this illustrative embodiment as a portal, to view nonlocal hierarchies. Furthermore, an immersive experience of the present invention allows the user to array a variety of hierarchical activity throughout a virtual space.

In this illustration, a nearby hierarchy 1130 might be an actively pursued organizational project, comprised of nested files and directories, whereas a larger hierarchy 1140 represents the entirety of a particular host device's data themed with uniform organizational method sets, for example indicating the directory structure of a home computer. The far more simply themed and organized hierarchy 1150 might represent a selection of directories and application programs, perhaps curated for the ease of use required by novice users or for rendering on less capable host devices and displays. A distant hierarchy 1160 could represent the data hierarchies on a separate host device, an example being the user's distant office computer connected via a network.

Botanically themed hierarchies and austere three-dimensional hierarchies are far from the only ornamental designs that can be themed and manipulated by the organizational methods and software architecture of the present invention. The user in FIG. 11, for example, has chosen to view certain threaded email conversations, internet forum discussions, and textual histories as a series of two-dimensional branching hierarchies 1170 themed as atmospheric lightning bolts. Similarly, the user in this example has been working on a number of exploratory ideas that have yet to be arranged within the more structured hierarchies 1130, 1140, and 1160. On a whim, the user in this example has chosen to represent these exploratory ideas as a nascent hierarchy 1180 themed as a branching neural cell floating free in virtual space.

Other visual motifs which assist the user in organizing data consistent with the present invention might include an artificial ground 1111 rendered in the same three-dimensional virtual space as the data hierarchies. In this illustrative example, a ground plane object 1111, which is perfectly flat plane only for clarity here, offers a temporarily location to drop unorganized data 1142, orphaned data, or portions of hierarchy prepared for deletion, much the same way two-dimensional computer "desktop" interfaces function today. In other embodiments, the artificial ground 1111 may alternately be presented as an undulating three-dimensional surface, as a continuous surface without bounds, as a sphere, or as any other object shape that serves as an ornamental host for a hierarchy 1130. In one embodiment, the artificial ground 1111 need not be planar, nor necessarily be presented at a human user scale as illustrated in FIG. 11. In other embodiments, the artificial ground 1111 alternately might not be provided at all, might not be presented as a visible object, and could be simply a region of space that functions as a substrate for attaching hierarchies. Beyond functioning as a host substrate to a plurality of hierarchies 1130, 1140, 1160 and 1142, an artificial ground 1111, if provided for as some object taking a visible physical shape, also provides a surface for casting two-dimensional shadows 1161 of a three-dimensional hierarchy 1160, so that more depth, clarity and/or alternate perspectives of a complex hierarchy can be offered to the user. The ground plane object 1111 may also be used to obscure sensitive areas of a hierarchy or system files and directories 1141 from haphazard user manipulation.

While an immersive display 1121 enables the disclosed interface design and methods to be readily navigated via user movement, it is often desirable to travel rapidly within virtual space, change the perceptual scale, and return to previous perspectives within and around managed hierarchies. The present invention is not limited in terms of one particular perceptual scale, that is to say the user 1110 in this illustrative example can arbitrarily change the simulated interocular distance of an immersive display, and/or scale the hierarchies up and down at will. Furthermore, previously used perspectives, scales, and view ports into managed hierarchies may be saved and recalled by using the visual metaphor of crepuscular rays of light. Semi-transparent, directional bounding volumes 1123, 1124, 1125, and 1126 indicate a previous perspective, or "viewing frustum," that the user has saved and may care to quickly return to. The user's current perspective is represented in this illustration by the frustum at 1122.

Because a user cannot be presented with a complete complex hierarchy in its entirety, and because doing so would strain the rendering capabilities of many host devices, the preferred embodiment would often obfuscate the "spikey" internal structural details of hierarchy that is not relevant to the user's current perspective 1122. In this example, an illustrative obscuring layer of foliage 1143, clouds, fogs, or other visually impenetrable surface is used to obscure areas of complex hierarchy in concert with the automatic "Level-of-Detail" controls within the software architecture.

Finally, the software architecture, interface design and methods disclosed by the present invention, and illustrated in FIG. 11, offers the user facilities to convey data not traditionally considered to be hierarchical, with far greater nuance and clarity. In this example, the hierarchy behind the user 1190 chronicles recent web browsing history, and various courses of this hierarchy pass through several planar portal interface elements 1191, represented here metaphorically as the multiple glass panes of a sectioned window's glazing. In this artful, yet functional mnemonic, the user sees browser history over time, but also teases out structures built automatically as a result of the maundering, bifurcating, and exploratory process of web browsing. Furthermore, the user may peer through the various panes of the sectioned window 1191 to perceive the various remote directory, file, and textual data hierarchies of the visited remote internet locations, as browsing history is directly connected to those remote structures via the planar portal metaphor.

In some embodiments, a combination of user activity and the software architecture disclosed herein generate the graphical form and visible cues present in affected data hierarchies. Alternatively, other embodiments may also allow artist-, or otherwise-generated graphical forms and uniquely crafted visual cues for hierarchy display, alternative ornamental interpretations of planar portal objects, and interface elements, although they behave and are structured in accordance with the present invention. For example, the hierarchy displayed by a remote internet web site might be presented and structured by the provider of that web site, that visiting users each approach a consistently themed and custom, curated hierarchy, combined with consistently themed planar portal metaphors 1010 (FIG. 10C), as well as consistently themed custom interface elements 970, 980, and 990 (FIGS. 9D and 9E), with which to manipulate, explore and use that hierarchy.

Figure 12A:
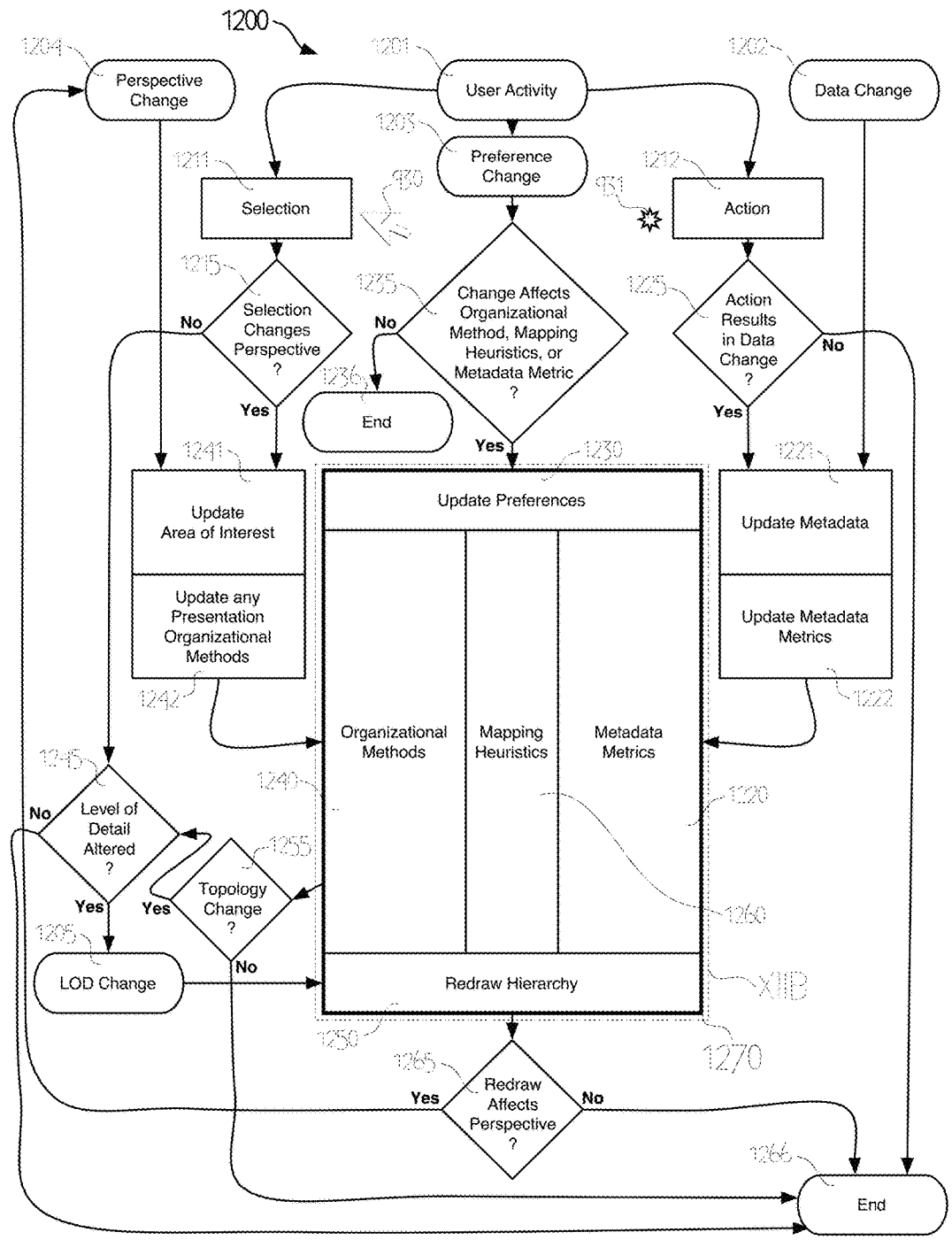
FIG. 12A is an illustrative logical process represented as a flowchart which defines reproducible functionality of a software architecture in accordance with one embodiment of the present invention.

FIG. 12A is a flowchart of an illustrative process for providing the functionality that generates hierarchy visualizations via algorithmic software architecture and user activity, in accordance with one embodiment of the invention. Process 1200 has multiple entry points, and may begin logic at starting step 1201, step 1202, step 1203, step 1204, or step 1205. At step 1201, the software architecture illustrated by process 1200 has begun due to some User Activity. User Activity passed to the software architecture from the pen- or ring-type input device, or from any conventional input device, may be comprised of three component aspects, the Selection of an element or region of the hierarchy, illustrated by step 1211, an Action performed on an element or region of the hierarchy, indicated by step 1212, and/or a Preference Change resulting from User Activity, represented by step 1204. Changes to preferences 1204 may also occur independent of User Activity 1201. Therefore process step Preference Change 1204 is also an entry point for process 1200.

In one embodiment, process 1200 must also respond Perspective Changes, illustrated by entry point step 1204. Perspective Changes include movement of the current perspective frustum 1122 (FIG. 11) resulting from movement of the input device's focus of action 930 (FIG. 9A), movement of the user relative to the host device 420, 520, or 530 (FIG. 4 and FIG. 5), user movement detected via motion tracking of stereoscopic eyewear 1121 (FIG. 11), or via the transformation, and/or rotation of a hierarchy relative to the user.

Process 1200 may also regenerate hierarchy visualizations resulting from changes to data being visualized, illustrated in accordance with the present invention by process entry point step Data Change 1202. For example, data being visualized as a hierarchy may change independently of User Activity 1201 in this embodiment, and the software architecture would respond to that input at entry point step Data Change 1202.

Lastly, one embodiment of the present invention's software architecture provides for hierarchy visualization generation triggered by entry point step LOD Change 1205. LOD, or "Level of Detail" changes constitute modifications to the desired or resultant detail or depth of the visible hierarchy to be displayed at any given moment. For example, the rendering of a complex graphical hierarchy visualization may take significant processing resources from the host device 420, 520, or 530 (FIG. 4 and FIG. 5). If the performance of the hierarchy visualization decreases, often measured in visual frames-per-second, one embodiment of the present invention's hierarchy visualization software architecture as illustrated by process 1200 would process that input as a request for a Level-of-Detail, or LOD Change entry point step 1205 and proceed. Similarly, if a network connection or other hierarchy data source on a host device constrains the speed at which the data can be accessed for processing, one embodiment would respond to that at the LOD Change entry point step 1505.

The path through one embodiment of the software architecture illustrated by process 1200 will now be described relative to data changes independent to user activity, causing input to entry point step 1202. Associated metadata, or data about data, that is maintained by one embodiment of this illustrative process would include historical visual positional and topological metadata, and would be updated in process step 1221 Update Metadata. Metadata associated to the changed data of entry point 1202 that would otherwise be primarily maintained by the host device operating system or host device file system, in one embodiment, might include that metadata traditionally maintained by file systems, such as Date Created, File Size and File Type. In the illustrated embodiment, all metadata associated with Data Change step 1202 is updated at process step 1221.

After updating metadata at process step 1221, the up-to-date raw metadata is further processed at step 1222 Update Metadata Metrics. Metadata metrics are the interpreted ordinal properties of metadata, which are then in a form that is useful for Preference-defined mapping of metadata to the visual Organization Methods. As an illustrative example, the raw metadata Date Created could consist of a variety of file creation dates. Ordered as raw metadata, from some arbitrary date, the ordinal properties of Date Created metadata may only cover a narrow span of time. In one embodiment, the Update Metadata Metrics process step 1222 may interpret the date ranges and focus the ordinal Date Created metrics on those ranges, and in so doing provide a more meaningful and detailed ordinal spread for mapping to the Organizational Methods. As another example, if raw File Type metadata enters process step 1222, one embodiment of the present invention's software architecture detects and clusters similar file types, and imposes ordinal separation of dissimilar file types, thus providing the Organizational Methods and the hierarchy visualization with more nuanced ranges, ordering, and associative relationships than raw metadata is able to provide. In embodiments according to this disclosure, a vast plurality of common metadata types may similarly be updated as metadata metrics at process step 1222.

In an embodiment of the software architecture illustrated by process 1200, the results of process step 1222 are subsequently stored as Metadata Metrics objects 1220, in the Hierarchy Properties data architecture 1270, which is illustrated in detail with FIG. 12B.

A similar path through the software architecture logic illustrated by process 1200 begins with User Activity entry point step 1201 that is comprised in part by some Action, interpreted at process step 1212. In one embodiment, User Actions within the software architecture include activity such as a deletion action (FIGS. 10A and 10B), hiding, moving or otherwise directly manipulating portions of a hierarchy. If, at step 1225, the software architecture determines that the User Action has resulted in changed data, the flow of illustrative process 1200 would pass through steps 1221 and 1222, similar to the metadata processing that occurs after Data Change entry point step 1202, albeit often with tighter access to the metadata and metrics being altered by the User, as they are often passed along directly as a component of User Action. For example, deletion action would result in Data Change, metadata from that Action concerning the deletion would enter process step 1221, along with file system data change metadata from entry point step 1202, and the up to date metadata would be used in process step 1222 to recalculate metadata metrics, that would then be passed to the Hierarchy Properties data architecture 1270. Conversely, if no data change resulted, as determined by decision step 1225 in one embodiment of illustrated process 1200, from the User Activity's Action, logic would proceed to stopping process step 1266, and consideration of that Action would end.

Another pathway through an illustrative process 1200, according to an embodiment of the present invention, begins with User Activity from entry point step 1201 that consists, at least partially, of a Selection event, and is initially processed at step 1211. A selection event is commonly considered to be the first active touch of an element of a hierarchy, and in one embodiment of the software architecture consists of initial active touch events produced by an input device's focus of action 930 (FIG. 9). Selection of hierarchy elements or portions of hierarchy often indicate a change in the User's Perspective. For example, in one embodiment selecting a hierarchy element that is entirely visible might not change the User's Perspective, or might zoom to fill a perspective more fully with the new selection, whereas selecting a hierarchy element that extends outside the bounds of the current User's Perspective might pan, track, orbit, and/or zoom out the perspective to fully display the new selection. In this illustrative process 1200, decision step 1215 makes the judgment as to whether the given selection alters the User's Perspective. If so, the new perspective is passed to process step 1241, which updates the User's Area of Interest. In one embodiment, an area of interest is a data structure that represents information about a user's current and past perspectives, current and past selections, open and recently opened files and elements of the hierarchy, and other aggregate information about the areas of the hierarchy which might be considered relevant to the user's current interests in navigating or manipulating the hierarchy. Furthermore, one embodiment of the present invention's software architecture rates this aggregate area of interest data structure in process step 1241, that priority may be given to display and processing areas of the hierarchy that are needed more immediately in the user's activities.

According to an embodiment of the present invention, once a current Area of Interest is calculated and updated in process step 1241, that Area of Interest is used to update any "Presentation" Organizational Methods in process step 1242. Presentation Organizational Methods, in one embodiment, are those organizational rule sets and rule subcomponents that depend on User Perspective, Area of Interest and current Selection to display portions of hierarchy their and items in a way that is responsive to these properties and knowledge structures. For example, an illustrative portion of a hierarchy 922 (FIG. 9A, 9B, 9C) can be seen to have a Presentation Organizational Method that "billboards" hierarchy item iconography 923, orienting it toward the User's Perspective. As another example, one embodiment may prevent hierarchy item iconography 923 from occluding other items in the set 923. All Organization Methods of this variety, termed "Presentation" methods 1283 in the embodiment illustrated by process 1200 details in FIG. 12B, is updated in process step 1242, with dependencies between Area of Interest properties and other Organizational Methods reconciled and passed into the Organizational Methods objects 1240 of the Hierarchy Properties data architecture 1270.

Conversely, a Selection 1211 may not be determined by decision step 1215 to have any effect on the User's Current perspective. If it does not, one embodiment of the software architecture instead proceeds to decision step 1245 in order to evaluate whether the selection performed by User Activity should alter the Level-of-Detail. An example of a Selection that would deemed by decision step 1245 to alter the Level-of-Detail of a visualized hierarchy include the selection of a visible portion of an example hierarchy. In one embodiment, the selection could result in child branches of the selected directory now becoming visible; in effect causing more detail or depth to be to be revealed in the hierarchy visualization. If LOD Change is deemed to occur at decision step 1245, that change is passed to LOD Change entry point step 1205. In this illustrative process, if decision step 1245 determines no LOD Change, logic proceeds and computation of the Selection ends and exits at stopping step 1266.

Another pathway through an illustrative process 1200, according to an embodiment of the present invention, begins with Perspective Change entry point step 1204. The new perspective is passed to process step 1241, which updates the User's Area of Interest in a manner consistent with a Selection 1211 which changes perspective at 1215, as described above. In one embodiment, an area of interest is a data structure that represents information about a user's current and past perspectives along with other aggregate information about the areas of the hierarchy which might be considered relevant to the user's current interests, given the current perspective of the user.

In an embodiment of the software architecture illustrated by process 1200, the bulk of activity occurs when the logical progression of the flowchart of FIG. 12A begins at Preference Change entry point step 1203, or when User Activity input 1201 is comprised partially or in whole by Preference Change commands. A preference changing command, in an embodiment as illustrated here, could be classified as a change or plurality of changed preferences which either affect Organizational Methods 1240 mappings 1260 to Metadata Metrics 1220, or those which do not have any effect on the method-metric mapping heuristics, a classification which happens at decision step 1235. If the preference change does not constitute a modification of the heuristic mappings 1260, or the methods and metrics they map, the progression of logic in process 1200 exits to end state 1236, and the hierarchy is left unmodified, unless the Preference Change 1203 was also accompanied by Selection 1211 or Action 1212 forms of user activity.

Figure 12B:
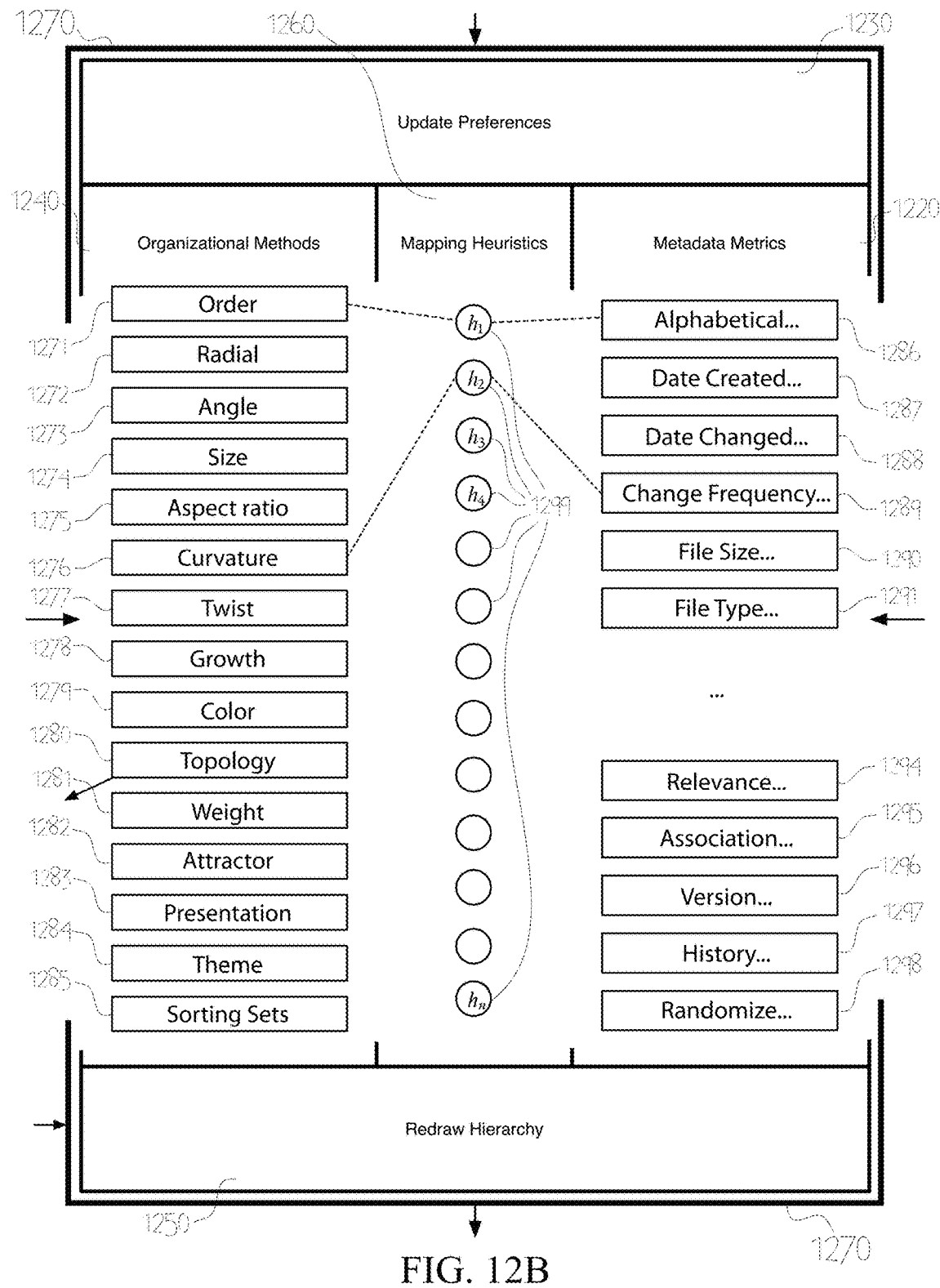
FIG. 12B is an illustrative example detail of the logical process given in FIG. 12A representing an example data structure and snapshot state of that data structure, in accordance with one embodiment of the present invention.

The central path through one embodiment of illustrative software architecture process 1200 occurs when Preference Changes that affect mappings and their associated methods and metrics pass to process step 1230, Update Preferences, and begin modification of the Hierarchy Properties data structure 1270, illustrated in more detail with FIG. 12B.

In FIG. 12B, the Hierarchy Properties data structure illustratively consists of a dynamic set of logical object relationships, in accordance with the present invention, which are interchangeable among a plurality of Organizational Methods 1240, Metadata Metrics 1220, and the Mapping Heuristics 1260 that comprise the dynamic connective logical bonds.

Process step 1230, in one embodiment, is both able to perceive existing methods, metadata metrics and their mapped relationships, as well as being able to immediately or smoothly transition heuristic mappings connections among methods and metrics.

In one embodiment, the Organizational Methods 1240 represent the superset of all possible Organizational Method choices that are able to appear in interface element 980 (FIGS. 9D and 9E). Generally speaking, Organizational Methods, as illustrated in data structure 1270 of process 1200, are those visual three-dimensional visual traits and structure-influencing processes that control the location, arrangement and appearance of items in a hierarchy visualized by an embodiment's software architecture.

In one embodiment of the present invention, the organizational method Order 1271 represents linear spatial order along the parent of any hierarchy member, method Radial 1272 corresponds to rotational positioning around the long axis of any hierarchy member's parent, method Angle 1273 correlates to an angular spatial rotation of any hierarchy element toward or away from the long axis of the parent's long axis, method Aspect ratio 1275 modifies the length of a hierarchy element's long axis relative to its girth at the basal end of its long axis where it connects to a parent, method Curvature 1276 modifies the adherence or repulsion of a hierarchy element's graphical representation to or from its logical long axis orientation, method Twist 1277 is here analogous to variable radial rotation around the long axis of a parent as a function of change along the length of that long axis, method Growth 1278 is defined as a rate of elongation of the long axis of a hierarchy element, method Color 1279 is a rule framework providing for the mapping of metadata metrics to visible shades in the graphical representation of hierarchy elements, method Topology 1280 describes the propensity of a hierarchy element to self organize any child elements it might connect with into artificially appearing hierarchy depth and branching complexity without modifying the underlying logical structure of the child hierarchy to match that artificially displayed topology, method Weight 1281 applies relative simulated physical gravitational forces to hierarchy elements either positively or negatively in the direction of the hierarchy's overall vertical axis, method Attractor 1282 is similar to method Weight 1281 with the distinction that repulsion from or attraction to an Attractor may be aligned to an arbitrarily defined axis, method Presentation refers to spatial arrangement of hierarchy elements that is relative to the user's current perspective 1122 (FIG. 11), method Sorting Sets 1285 refers to any combination of a plurality of Organizational Methods so grouped as to readily enable and disable complex combinations of several methods, and finally method Theme 1284 here refers to tertiary combinations of Sorting Sets, Topologies, and rules that dictate their variable use across the Areas of Interest and other regions within a hierarchy. In the preferred embodiment, Theme methods are also paired with graphical resources used for displaying particular ornamental designs.

Among organizational methods, Topology 1280 restructuring is functionally unique in that it possibly affects LOD Change 1205 directly. If Topology configuration occurs at a particular Area of Activity 922 (FIG. 9A, 9B, 9C), and it passes decision step 1255 by changing topology artificially or logically, and subsequently passes decision step 1245 by increasing level of depth or breadth details to be displayed in the visualization beyond a particular Area of Activity 922 detail level by displacing low priority levels of detail, or by decreasing observable hierarchy breadth or depth, thus freeing resources of high priority which, in one embodiment, may be managed in step 1205 as a Level-of-Detail priority queue, self-balancing search tree, or similar ordered abstract data type.

Organizational Method Sorting Sets 1285 are also functionally unique, in that they store a plurality of other, configured organizational methods, including other Sorting Sets. By storing sets of organizational sorting methods 1240, complete with their configuration values intact, the software architecture or the user of one embodiment can recall, mix and match Sorting Sets, thereby dramatically altering the visual appearance of the hierarchy by changing many mapped Organizational Methods simultaneously. The utility in Sorting Sets is that they form the foundation of many Topology methods 1280, Themes 1284, and yet other, more complex Sorting Sets.

Thematic methods of organization 1284 are especially unique among other methods, as they not only comprise Selection Sets 1285 and the topological-style hierarchy filters of Topology methods 1280, they also carry with the Theme various graphical data with which to present a particularly rehearsed collection of ornamental design, interface design, preconfigured visual Organization Methods, and, in one embodiment, the hierarchical data can travel within a particular Theme and a plurality of Themes can travel with portions of hierarchy. For example, a hypothetical remote filesystem or internet-accessible file hierarchy, as illustrated in FIG. 10C, may provide its own Theme 1284, to optionally be applied while visiting users are browsing and manipulating the remotely-hosted hierarchy 1026. A Theme thus provided and optionally applied by the user of one embodiment of the software architecture and interface design of the present invention could alter not only the visible structural qualities and Organizational Methods used to display the hierarchy, it could also provide customized ornamental designs for planar portal interface metaphors 1010 (FIG. 10C); customized ornamental design of controlling interface elements 970, 980, 990 (FIGS. 9D and 9E); and also customized sets of Actions, Organizational Methods, and Metadata Metrics contained within interface elements 970, 980, and 990, with which a user may use to navigate the remote hierarchy. As another example, a Theme method of organization 1284 may completely sculpt the display of and access to a hierarchy visualization generated by the one embodiment of the present invention's software architecture, and that Theme could be made to always be associated with a particular hierarchy or portion of a hierarchy.

Although discussed in relation to the illustrative process 1200 of FIG. 12A, in one embodiment the Metadata Metrics are referred to specifically as functional members of the Hierarchy Preference data structure 1270 detailed in FIG. 12B. A plurality of Metadata Metrics 1220 are present in illustrative data structure 1270, having passed in from process step 1222 (FIG. 12 A). For example, curated ranges of metric Date Created 1287 are available within data structure 1270 in a format suitable for an ordinal mapping to various Organizational Methods 1240.

Specifically, one embodiment of the process step 1222 (FIG. 12A) provides data structure 1270 with an Alphabetical Metadata Metric 1286 which sorts alphabetical metadata into curated, ordered ranges of alphabetic order, with a Date Created metric 1287 and Date Changed metric 1288 which sort file creation dates into discrete ranges of time, with Change Frequency 1289 and History metric 1297 which track changes to metadata over time, with File Size and File Type metadata metrics gathered from host device filesystem-provided metadata for ordinal and clustering relationships, with a plurality of other metadata metrics (not shown) tailored to interpret the particular changed data and File Types provided to process step 1221, with Relevance metrics 1294 which order search result metadata in ranges suitable for mapping to Organizational Methods, with metric Association 1295 which identifies similarities between otherwise unrelated metadata using techniques like qualitative comparative analysis, with Version metrics 1296 that identify metadata originating from any Version Control Systems which may be managing portions of a hierarchy, and with Randomized metrics 1298 which modify ranges and patterns of randomness for appropriate mapping to visual Organization Methods. For example, a user may cause a preference change, via the illustrative process step 1203 of one embodiment, by deciding to map the organizational Angle method 1273 to a Randomized metric 1298. In this embodiment, a purely random range of values would be unsuitable for the Angle 1273 method of visually manipulating a hierarchy element versus the orientation of the long axis of its parent, instead a curated randomized range of angles from near 0 to near 180 degrees are most appropriate for the desired mapping. However, if a randomize metric 1298 were mapped to Radial method 1272, a more appropriate range of random angles from 0 to 360 might be provided by the Randomize metric via the heuristic mapping. Similarly, the other Metadata Metrics 1220 of the data structure 1270, in accordance to one embodiment, are able to translate raw metadata from process step 1221 into more closely comparable clusters and/or ranges appropriate for the variety of Organizational Methods 1240.

In one embodiment of the present invention, the role of dynamically linking Organizational Methods 1240 among Metadata Metrics 1220 is fulfilled by a plurality of Heuristic Mappings 1260, illustrated by symbols 1, 2, 3, 4, through n. Heuristic Mappings are dynamically instantiated and broken connections 1299, configuration states, literal or biased ordinal mappings, and other nuanced relationships established, in accordance with one embodiment, as the primary connective logical device among methods and metrics in the example Hierarchy Preference data structure's 1270 state illustrated by FIG. 12B.

In one embodiment, after the Updating Preferences process step 1230 forms the desired connections among Organizational Methods 1240 and Metadata Metrics 1220 by creating or removing connective Mapping Heuristics 1260, the logical flow of illustrative process 1200 proceeds to Redraw Hierarchy process step 1250. In one embodiment, process step 1250 maintains a logical representation of the graphical hierarchy detects changes to the structure caused by changed Mapping Heuristics 1260, and responds to those changes when regenerating that graphical representation of a hierarchy on host device displays. For example, in the illustrative state of Hierarchy Preference data structure 1270, method Order 1271 is mapped to an Alphabetical metric by at least one heuristic 1299, and method Curvature 1276 is similarly mapped to Change Frequency 1289. If an Update Preference process step subsequently creates a new heuristic in this example state, mapping data structure between Radial sorting method 1272, then one embodiment of the present invention provides for a Redraw Hierarchy process step 1250, which detects the new heuristic. Redraw Hierarchy 1250 in this example either immediately redisplays the updated visual hierarchical relationships, with radial angles mapped to File Type metrics that cluster similar file types throughout 360 degree angular sweeps around parent hierarchy element axes, or alternatively applies the updated visual structure more slowly, in one embodiment by redrawing the hierarchy many times, thus appearing to animate the application of new Heuristic Mappings over time.

Process flow would then pass to illustrative decision step 1265, which, in one embodiment, determines whether any redisplay of updated hierarchy portions resulting from process step 1250 has altered the perspective of a user unto the hierarchy. For example, a significant change in visual hierarchy structure or topology resulting from new mappings 1260, could require translating the user's perspective laterally, in order to keep the area of the hierarchy being manipulated visible and/or centered in the user's perspective. In such circumstances, the illustrative software architecture 1200 proceeds to follow a logical process defined from entry point step Perspective Change 1204, above. If no perspective change is determined necessary by decision step 1265, then the process logic of one embodiment would exit computation at end step 1266.

It is also worth noting that a vast set of possible distinguishing ornamental designs might be applied in addition to, or as alternatives to the preferred embodiment's ornamental designs, while still being founded in the user interface design and methods disclosed here. Along with the aforementioned Organizational Methods 1240 which modify visible features of the volumetric bodies which represent the spatial and structural attributes within a hierarchy, many other visual cues and perceivable mappings of those nodes are possible, while not being readily reproducible in monochromatic illustrative figures. Visual cues and non-visual properties which might be expressed in one embodiment according to the present invention include but are not limited to: custom symbolic objects, textures, or imagery applied to particular nodes; the visually-perceived surface bumpiness, roughness or tactile sensation associated with virtually graspable volumetric bodies, both as presented visually or via the input device's perceivable detent, cogging, or vibration; the forces of attraction, clustering or gravitation between hierarchy elements and among similar properties or node types in the visualization space (even though they may reside in disparate logical regions of the hierarchy); the orientation of nodes toward external attractors (such as simulated sunlight, filetype filters, persistent dynamic searches, or creator application type association filters); and the multitudinous combinations of methods, Sorting Sets, and the maticrelationships that a user, empowered by the disclosed techniques, develops over a longer timescale, intimately organizing and perceiving specific, familiar, personal datasets.

The preferred embodiment of this user interface and software architecture is responsible for a variety of autonomous balancing and space-filling techniques that, combined with goal states such as evoking a familiar, themed branching structure (like lightning, oak trees, or neurons), is also responsible for organizing, balancing or separating visual clutter, ensuring clarity and legibility, and preventing unwanted three-dimensional occlusion with Presentation methods, dynamic Topological methods, and the ability of process step 1230 to apply both literal and loose heuristic mapping of methods to an extensible set of possible metadata metrics 1220. In one embodiment, many more similar mappings, combinations of mappings, and layers of competing, weighted mappings are possible, sharing in common their reliance on and employment of a similar hierarchy visualization interface and a software architecture structure, with capabilities similar to those presented in this disclosure, and therefore should be considered revealed by the present invention.

In providing a structured, methodical design for the visualization of hierarchical relationships, of a variety of visual cues and tangible mappings for the metadata of digital data, as well as disclosing several embodiments of input device invention which allow for facile manipulation of such rich visual hierarchy, the present invention expands definitively and meaningfully upon prior art in the field of human-computer interfacing, input hardware design, and interaction methods.

The present invention provides a novel software interface and hardware input device embodiments for visualizing and manipulating a complex hierarchy of associations and organizations in three-dimensional physical spaces and in virtual spaces generated by host devices. Additionally, certain embodiments may function as unique hardware platforms for carrying the user credentials supplied by and delivered to third-party authentication software, the ability to dynamically authenticate a user as he or she manipulates various host devices, information hierarchies, or services with input devices in accordance with the present invention. While no two hierarchies might appear exactly alike in ornamental design or topological structure, the uniform software architecture and methods for organizing hierarchical data disclosed here may allow a user to quickly perceive and manipulate relationships in both familiar and unfamiliar hierarchies.

While the illustrative systems, ornamentation, interface designs and methods as described herein illustrate various aspects of the present invention, they are shown by way of example. It will be understood that the invention is not limited to these embodiments. Modifications may be made by those skilled in the art, particularly in the light of the forgoing teachings. For example, each of the elements of the aforementioned embodiments may be utilized alone or in combination with the elements of other embodiments. Additionally, the invention has been defined using the appended claims, however these claims are exemplary in that the invention is intended to include the elements and methods described herein in any combination, arrangement, larger embodiment or sub-combination. It will also be understood and appreciated that modifications may be made without departing from the true spirit and scope of the invention.

What is claimed is:

1. A system for manipulating hierarchically structured information on a host device having a user interface input device for operative interaction with an information appliance or computational electronic device, said system comprising:
    a user input device comprising a body, said body including an input mechanism, an inertial sensor, and a feedback mechanism; and
    a host device having a display;
    said inertial sensor operative to detect movement of said body, with said input device wirelessly communicating with said host device to transfer data to said host device, and with said feedback mechanism operable to provide a response to a user of said input device;
    wherein said host device comprises an information appliance or computational electronic device, and wherein said display displays a discernable two- or three-dimensional representation of a hierarchy on said display with said hierarchy being represented by a visually structured volumetric collection of nodes and topologies, and wherein said input mechanism is operative to enable a user to map metadata, hierarchy and node properties to alter the appearance of said discernable two- or three-dimensional representation of said hierarchy.

2. The system of claim 1, wherein said body comprises an elongate longitudinal housing.

3. The system of claim 2, wherein said input mechanism transects said body.

4. The system of claim 3, wherein said input mechanism comprises a scroll wheel.

5. The system of claim 4, wherein said input device is operable to manipulate and orient the nodes in the display of said discernable two- or three-dimensional hierarchy representation via rotation of said scroll wheel.

6. The system of claim 1, wherein said body has a generally toroidal shape.

7. The system of claim 6, wherein said input mechanism encircles said body.

8. The system of claim 7, wherein said input mechanism is rotatable and wherein said input device is operable to manipulate and orient the nodes in the display of said discernable two- or three-dimensional hierarchy representation via rotation of said input mechanism.

9. The system of claim 6, wherein said input device is operable to manipulate and orient the nodes in the display of said discernable two- or three-dimensional hierarchy representation via the orientation and position of said generally toroidal shape body.

10. The system of claim 1, wherein said inertial sensor detects movement over six degrees of freedom.

11. The system of claim 10, wherein said input device is operable to manipulate and orient the nodes in the display of said discernable two- or three-dimensional hierarchy representation via the orientation and position of said inertial sensor.

12. The system of claim 1, wherein said input device is operable to manipulate and orient the nodes in the display of said discernable two- or three-dimensional hierarchy representation via the orientation and position of said elongate longitudinal housing.

* * * * *